United States Patent
Haltmeyer

(10) Patent No.: US 7,227,657 B1
(45) Date of Patent: *Jun. 5, 2007

(54) PRINTER MANAGEMENT PROTOCOL

(75) Inventor: John M. Haltmeyer, Clarksville, MD (US)

(73) Assignee: Tricerat, Inc., Columbia, MD (US)

(*) Notice: Subject to any disclaimer, the term of this patent is extended or adjusted under 35 U.S.C. 154(b) by 794 days.

This patent is subject to a terminal disclaimer.

(21) Appl. No.: 09/693,245

(22) Filed: Oct. 20, 2000

Related U.S. Application Data

(60) Provisional application No. 60/161,239, filed on Oct. 22, 1999.

(51) Int. Cl.
G06F 15/00 (2006.01)
G06F 13/10 (2006.01)
(52) U.S. Cl. .................................. 358/1.15; 358/1.13
(58) Field of Classification Search ....... 358/1.11–1.18
See application file for complete search history.

(56) References Cited

U.S. PATENT DOCUMENTS 5,580,177 A * 12/1996 Gase et al. .................... 400/61
5,675,782 A * 10/1997 Montague et al. .......... 713/201

* cited by examiner

*Primary Examiner*—King Y. Poon
(74) *Attorney, Agent, or Firm*—Armstrong, Kratz, Quintos, Hanson & Brooks, LLP

(57) ABSTRACT

A protocol, or method, for managing the printers and printer connections for users on a computer network based on the user's group membership, user name, terminal name (client name) and computer name.

Network administrators can centrally manage the assignment of user's printers and network printer connections on any networked computer system, including Microsoft Windows NT Terminal Server Edition. Installation of required drivers is dynamic with no interaction with the user.

5 Claims, 65 Drawing Sheets

Implementation CODE

MainUnit.h
//--------------------------------------------------------------------
ifndef MainUnitH
define MainUnitH
//--------------------------------------------------------------------
include <Classes.hpp>
include <Controls.hpp>
include <StdCtrls.hpp>
include <Forms.hpp>
include <Dbtables.hpp>
include <NetworkInfo.h>
include <ShellApi.h>
include <ExtCtrls.hpp>
include <TriceratMessaging.h>
include <DirTools.h>

//--------------------------------------------------------------------
class TMainForm : public TForm
{
__published:    // IDE-managed Components
    TNetworkInfo *FNetworkInfo;
    TButton *CloseBtn;
    TTimer *IcaPrinterSecurity;
    TTimer *Initialize;
    void __fastcall CloseBtnClick(TObject *Sender);
    void __fastcall FormCreate(TObject *Sender);
    void __fastcall FormShow(TObject *Sender);
    void __fastcall InitializeTimer(TObject *Sender);
    void __fastcall FormHide(TObject *Sender);
    void __fastcall FormActivate(TObject *Sender);
    void __fastcall IcaPrinterSecurityTimer(TObject *Sender);
    void __fastcall FormClose(TObject *Sender, TCloseAction &Action);

private:    // User declarations
    AnsiString PrinterInfoPath;
    TStringList *LocalPrinters;
    TStringList *NetworkPrinters;
    bool bClearNetworkPrinters;
    bool bSetIcaPrinterRights;
    bool DefaultPrinterSet;
    bool Initializing;
    int IcaPrinterRightsDelay;
    int StartupDelay;

void __fastcall AddOwners(TStrings* sql);
    void __fastcall AddLocalPrinters();
    void __fastcall AddNetworkPrinters();
    void OnDesktopInit(TMessage Message);
    void ClearNetworkPrinters();
    void CleanUp();
    void OnQueryEndSession(TMessage Message);
    void OnEndSession(TMessage Message);
    bool GetPrinterRights(TStringList * Users);
```

FIG. 6-1

```
public:          // User declarations
    __fastcall TMainForm(TComponent* Owner);
    __fastcall ~TMainForm();
    int ProductID;
    AnsiString LogFile;
    TDirTools *DirTools;

protected:
    BEGIN_MESSAGE_MAP
        VCL_MESSAGE_HANDLER(TM_D2K_INIT, TMessage, OnDesktopInit)
        VCL_MESSAGE_HANDLER(WM_ENDSESSION, TMessage, OnEndSession)
    END_MESSAGE_MAP(TForm)
};
//---------------------------------------------------------------
extern PACKAGE TMainForm *MainForm;
//---------------------------------------------------------------
endif MainUnit.Cpp
include <vcl.h>
pragma hdrstop
//--------------------------------------------------------------- include "MainUnit.h"
include "NetworkInfo.h"
include <PrinterControl.h>
include <RegTools.h>
//--------------------------------------------------------------- pragma package(smart_init)
pragma link "NetworkInfo"
pragma resource "*.dfm"
//---------------------------------------------------------------

TMainForm *MainForm;
//---------------------------------------------------------------

STEP 100
__fastcall TMainForm::TMainForm(TComponent* Owner)
    : TForm(Owner)
{
    Session->Active = false;
    LocalPrinters = new TStringList;
    NetworkPrinters = new TStringList;
    DefaultPrinterSet = false;
    Initializing = false;
}
//---------------------------------------------------------------

STEP 170
__fastcall TMainForm::~TMainForm()
{
```

FIG. 6-2

```
    delete LocalPrinters;
    delete NetworkPrinters;
    DirTools->WriteLog(LogFile, "Terminating PMP Client");
    delete DirTools;
}
//------------------------------------------------------------------------ void __fastcall TMainForm::AddOwners(TStrings* sql)
{
    AnsiString ClientName;
    AnsiString ComputerName;
    ClientName = getenv("CLIENTNAME");
    if (!ClientName.IsEmpty())
        ClientName = ClientName.UpperCase();
    ComputerName = getenv("COMPUTERNAME");

FNetworkInfo->Clear();

sql->Add(" IN (SELECT ID FROM Owners WHERE Name = '" +
        FNetworkInfo->UserName + "'");

if (FNetworkInfo->LocalComputerName != ("\\\\" + FNetworkInfo->DomainName))
    {
        FNetworkInfo->SourceServerName = FNetworkInfo->DomainControllerName;

for (int i = 0; i < FNetworkInfo->MyGlobalGroupCount; i++)
            sql->Add(" OR Name = '" + FNetworkInfo->MyGlobalGroupNames[i] + "'");
    }

FNetworkInfo->SourceServerName = "";

for (int i = 0; i < FNetworkInfo->MyLocalGroupCount; i++)
        sql->Add(" OR Name = '" + FNetworkInfo->MyLocalGroupNames[i] + "'");

if (!ClientName.IsEmpty() && ClientName != ComputerName)
        sql->Add(" OR Name = '" + ClientName + "'");
    if (!ComputerName.IsEmpty())
        sql->Add(" OR Name = '" + ComputerName + "'");

sql->Add(")");
}
//------------------------------------------------------------------------

STEP 130
void __fastcall TMainForm::AddLocalPrinters()
{
    TQuery* query = new TQuery(NULL);
    int i;
    AnsiString SourceServer;
    AnsiString Monitor;
    AnsiString Port;
    AnsiString FileName;
    AnsiString PrinterName;
    AnsiString NewPrinterName;
    AnsiString ClientName;
    bool IsDefault;
```

FIG. 6-3

```
TStringList *Messages = new TStringList();
TStringList *Users = new TStringList();

GetPrinterRights(Users);

ClientName = getenv("CLIENTNAME");
if (!ClientName.IsEmpty())
   ClientName = ClientName.UpperCase();
else
   ClientName = FNetworkInfo->UserName;

query->DatabaseName = "Tricerat PMP";
```

STEP 200
```
   query->SQL->Add("SELECT o.Ordinal, a.Ordinal, p.FileName, p.Name, ");
   query->SQL->Add("p.Port, p.Monitor, p.SourceServer, a.IsDefault ");
   query->SQL->Add("FROM Owners o, AssignedLocalPrinters a, LocalPrinters p ");
   query->SQL->Add("WHERE o.ID = a.OwnerID AND a.LocalPrinterID = p.ID ");
   query->SQL->Add("AND p.Disabled = False ");
   query->SQL->Add("AND a.OwnerID ");
```

STEP 210
```
   AddOwners(query->SQL);

query->SQL->Add(" ORDER BY Ordinal");

try
   {
```
STEP 220
```
      query->Open();
```

STEP 230
```
      i = -1;
      while (query->Active && !query->Eof && query->RecordCount > ++i)
      {
         //Add printers here.
         SourceServer = query->FieldByName("SourceServer")->AsString;
         Monitor = query->FieldByName("Monitor")->AsString;
         Port = query->FieldByName("Port")->AsString;
         FileName = query->FieldByName("FileName")->AsString;
         PrinterName = query->FieldByName("Name")->AsString;
         IsDefault = query->FieldByName("IsDefault")->AsBoolean;
         NewPrinterName = ClientName + "#" + PrinterName;

try
         {
```
STEP 240
```
            //Constructor to point to local computer for drivers.
            TPrinterControl *PrinterControl = new TPrinterControl(
               PrinterInfoPath, SourceServer);

if (!Port.IsEmpty() && !Monitor.IsEmpty())
               PrinterControl->RemapPort(Port, Monitor);
```

STEP 250
```
            //Create the temp printer.
            if (PrinterControl->CreateLocalPrinter(FileName, NewPrinterName, Users))
```

FIG. 6-4

```
              {
                 LocalPrinters->Add(NewPrinterName);
                 if (IsDefault && !DefaultPrinterSet)
                 {
STEP 260
                    if (PrinterControl->SetDefaultPrinter(NewPrinterName))
                       DefaultPrinterSet = true;
                 }
              } if (0 < PrinterControl->Messages->Count)
                 Messages->Add(PrinterControl->Messages->Text);

delete PrinterControl;
           }
           catch(...)
           {
              Messages->Add("Error Creating Printer \"" + NewPrinterName + "\"");
           } query->FindNext();

Next();
        }

}
     catch (...)
     {
     } query->Close();
     delete query;

Users->Clear();
     delete Users;

STEP 270
     if (0 < Messages->Count)
     {
        MessageBox(NULL, Messages->Text.c_str(), "PMP CLient",
           MB_OK | MB_ICONERROR | MB_SYSTEMMODAL);
     }
  }
//---------------------------------------------------------------

STEP 140
void __fastcall TMainForm::AddNetworkPrinters()
{
  TQuery* query = new TQuery(NULL);
  int i;
  AnsiString Map;
  AnsiString PrinterName;
  AnsiString FullShareName;
  AnsiString FullPrinterName;
  AnsiString Argument;
  bool IsDefault;
  DWORD dwError;
```

FIG. 6-5

```
query->DatabaseName = "Tricerat PMP";
```

STEP 300
```
query->SQL->Add("SELECT o.Ordinal, a.Ordinal, p.Name, a.Map, a.IsDefault ");
query->SQL->Add("FROM Owners o, AssignedNetworkPrinters a, NetworkPrinters p ");
query->SQL->Add("WHERE o.ID = a.OwnerID AND a.NetworkPrinterID = p.ID ");
query->SQL->Add("AND p.Disabled = False ");
query->SQL->Add("AND a.OwnerID ");
```

STEP 310
```
AddOwners(query->SQL);

query->SQL->Add(" ORDER BY Ordinal");

try
{
    //Constructor to point to local computer for drivers.
    TPrinterControl *PrinterControl = new TPrinterControl(
        NULL, NULL);
```

STEP 320
```
    query->Open();
```

STEP 330
```
    i = -1;
    while (query->Active && !query->Eof && query->RecordCount > ++i)
    {
        //Add printers here.
        PrinterName = query->FieldByName("Name")->AsString;
        Map = query->FieldByName("Map")->AsString;
        IsDefault = query->FieldByName("IsDefault")->AsBoolean;
```

STEP 340
```
        if (!AddPrinterConnection(PrinterName.c_str()))
        {
            dwError = GetLastError();
            AnsiString Message;
            Message = "Unable to connect to printer " + PrinterName + " \n\n";
            Message = Message + "Error Code = " + String(dwError);

query->FindNext();
            continue;
        }

FullShareName = PrinterControl->GetPrinterShareName(PrinterName);
        FullPrinterName = PrinterControl->GetPrinterFullName(PrinterName);

NetworkPrinters->Add(FullPrinterName);
```

STEP 350
```
        if (IsDefault && !DefaultPrinterSet)
        {
            if (!PrinterControl->SetDefaultPrinter(FullPrinterName))
                ShowMessage(PrinterControl->Messages->Text);

DefaultPrinterSet = true;
        }
```

FIG. 6-6

```
        if (!Map.IsEmpty())
        {
          Argument = "use " + Map + " /d";
                      ShellExecute(NULL, "open", "net", Argument.c_str(),
             NULL, SW_HIDE);

Argument = "use " + Map + " " + FullShareName;
                      ShellExecute(NULL, "open", "net", Argument.c_str(),
             NULL, SW_HIDE);

}
```

STEP 360

```
        MessageBox(NULL, Message.c_str(), "PMPClient",
          MB_OK | MB_ICONERROR | MB_SYSTEMMODAL);

query->FindNext();

Next();
      } delete PrinterControl;
    }
    catch (...)
    {
    } query->Close();
    delete query;
}
//------------------------------------------------------------------------ void __fastcall TMainForm::CloseBtnClick(TObject *Sender)
{
   CleanUp();
}
//------------------------------------------------------------------------ void __fastcall TMainForm::FormCreate(TObject *Sender)
{
   FormHide(Sender);
}
//------------------------------------------------------------------------ void __fastcall TMainForm::FormShow(TObject *Sender)
{
   TRegistry *Reg = new TRegistry;
   LogFile = String(getenv("TEMP")) + "\\PMP.txt";
   DirTools = new TDirTools();

ShowWindow(Application->Handle, SW_HIDE);

Reg->RootKey = HKEY_LOCAL_MACHINE;
```

FIG. 6-7

```
if (Reg->OpenKey("Software\\Tricerat\\PMP", true))
{
   PrinterInfoPath = Reg->ReadString("PrinterInfo Path");

try
   {
      bClearNetworkPrinters = Reg->ReadBool("ClearNetworkPrinters");
   }
   catch (...)
   {
      bClearNetworkPrinters = false;
      Reg->WriteBool("ClearNetworkPrinters", bClearNetworkPrinters);
   } try
   {
      bSetIcaPrinterRights = Reg->ReadBool("SetIcaPrinterRights");
   }
   catch (...)
   {
      bSetIcaPrinterRights = false;
      Reg->WriteBool("SetIcaPrinterRights", bSetIcaPrinterRights);
   } try
   {
      IcaPrinterRightsDelay = Reg->ReadInteger("IcaPrinterRightsDelay");
   }
   catch (...)
   {
      IcaPrinterRightsDelay = 15;
      Reg->WriteInteger("IcaPrinterRightsDelay", IcaPrinterRightsDelay);
   } try
   {
      StartupDelay = Reg->ReadInteger("StartupDelay");
   }
   catch (...)
   {
      StartupDelay = 30;
      Reg->WriteInteger("StartupDelay", StartupDelay);
   }

}
Reg->CloseKey();
Reg->Free();

if (PrinterInfoPath.IsEmpty())
{
   MessageBox(NULL, "Unable to Read Registry Values!", "PMPClient",
      MB_OK | MB_ICONERROR | MB_SYSTEMMODAL);
   Close();
} if (5 < StartupDelay)
```

FIG. 6-8

```
      Initialize->Interval = StartupDelay * 1000;
   else
      Initialize->Interval = 5000;

DirTools->WriteLog(LogFile, "StartupDelay = " + String(Initialize->Interval));

STEP 110
   //This can be stopped if Desktop sends us a message.
   Initialize->Enabled = true;

if (bSetIcaPrinterRights)
   {
      if (5 < IcaPrinterRightsDelay)
         IcaPrinterSecurity->Interval = IcaPrinterRightsDelay * 1000;
      else
         IcaPrinterSecurity->Interval = 5000;

IcaPrinterSecurity->Enabled = true;
   }
}
//-------------------------------------------------------------

STEP 160
void TMainForm::CleanUp()
{
   int i;
   HWND hWnd;

//Wait for RegSet.
   hWnd = (HWND)1;
   while (NULL != hWnd)
   {
      hWnd = FindWindow("TRegSetMainForm", NULL);

if (NULL != hWnd)
      {
         SendMessage(hWnd, WM_CLOSE, NULL, NULL);
      }

Sleep(100);
   } try
   {
      //Constructor to point to local computer for drivers.
      TPrinterControl *PrinterControl = new TPrinterControl(
         NULL, NULL);

i = -1;
      while (LocalPrinters->Count > ++i)
      {
         PrinterControl->DeleteLocalPrinter(LocalPrinters->Strings[i]);
      } delete PrinterControl;

```
            while (NetworkPrinters->Count > ++i)
            {
                DeletePrinterConnection(NetworkPrinters->Strings[i].c_str());
            }
        }
        catch(...)
        {
        }
    }
//------------------------------------------------------------

STEP 120
void TMainForm::ClearNetworkPrinters()
{
    try
    {
        //Constructor to point to local computer for drivers.
        TPrinterControl *PrinterControl = new TPrinterControl(
            NULL, NULL);

PrinterControl->ClearNetworkPrinters();

delete PrinterControl;
    }
    catch(...)
    {
    }
}
//------------------------------------------------------------ void __fastcall TMainForm::InitializeTimer(TObject *Sender)
{
    Initialize->Enabled = false;
    Initializing = true;
    LogFile = String(getenv("TEMP")) + "\\PMP.txt";
    DirTools = new TDirTools();

try
    {
        if (bClearNetworkPrinters)
        {
            DirTools->WriteLog(LogFile, "Clearing Network Printers");
            ClearNetworkPrinters();
        }

Session->Active = true;

DirTools->WriteLog(LogFile, "Add Local Printers");
        AddLocalPrinters();
        DirTools->WriteLog(LogFile, "Finished With Local Printers");

DirTools->WriteLog(LogFile, "Add Network Printers");
        AddNetworkPrinters();
        DirTools->WriteLog(LogFile, "Finished With Network Printers");

Session->Active = false;
```

FIG. 6-10

```
    }
    catch(...)
    {
    }

Initializing = false;
}
//---------------------------------------------------------- void __fastcall TMainForm::IcaPrinterSecurityTimer(TObject *Sender)
{
    IcaPrinterSecurity->Enabled = false;

try
    {
        //Constructor to point to local computer for drivers.
        TPrinterControl *PrinterControl = new TPrinterControl(
            NULL, NULL);

PrinterControl->SetIcaPrinterRights();

delete PrinterControl;
    }
    catch(...)
    {
    }

}
//---------------------------------------------------------- void __fastcall TMainForm::FormHide(TObject *Sender)
{
    ShowWindow(Application->Handle, SW_HIDE);
    BorderStyle = bsNone;
    Width = 0;
    Height = 0;
}
//---------------------------------------------------------- void __fastcall TMainForm::FormActivate(TObject *Sender)
{
    ShowWindow(Application->Handle, SW_HIDE);
}
//---------------------------------------------------------- void TMainForm::OnDesktopInit(TMessage Message)
{
    if (0 == Message.WParam)
    {
        DirTools->WriteLog(LogFile, "PMP Received Message Desktop is Initializing");
        while(Initializing)
        {
            Sleep(1000);
```

FIG. 6-11

```
    }
      Initialize->Enabled = false;
  } if ( 1 == Message.WParam)
  {
    DirTools->WriteLog(LogFile, "PMP Received Message From Desktop to Initialize");
    DefaultPrinterSet = false;
    Initialize->Enabled = false;
    Initialize->Interval = 1000;
    Initialize->Enabled = true;
  }
}
//-------------------------------------------------------------------------

STEP 150
void TMainForm::OnEndSession(TMessage Message)
{
  DirTools->WriteLog(LogFile, "PMP Cleanup In Progress");
  CleanUp();
  DirTools->WriteLog(LogFile, "PMP Cleanup Finished");
  Application->Terminate();
}
//------------------------------------------------------------------------- void __fastcall TMainForm::FormClose(TObject *Sender, TCloseAction &Action)
{
  CleanUp();
}
//------------------------------------------------------------------------- bool TMainForm::GetPrinterRights(TStringList * Users)
{
  TRegistry *Reg = new TRegistry();

if (!Users)
    Users = new TStringList();

Users->Clear();

Reg->RootKey = HKEY_LOCAL_MACHINE;
  if (Reg->OpenKey("Software\\Tricerat\\PMP", true))
  {
    if (Reg->ValueExists("PrinterRights"))
    {
      try
      {
        AnsiString tempString;
        BYTE *pTemp = NULL;
        DWORD dwType = 0;
        DWORD dwSize = 0;
        int i = 0;

RegQueryValueEx(Reg->CurrentKey, "PrinterRights",
```

FIG. 6-12

```
                NULL, &dwType, pTemp, &dwSize);

pTemp = (BYTE*)malloc(dwSize);
          ZeroMemory(pTemp, dwSize);

RegQueryValueEx(Reg->CurrentKey, "PrinterRights",
             NULL, &dwType, pTemp, &dwSize);

if (0 < dwSize)
          {
             i = -1;
             while ((int)dwSize > ++i)
             {
                if ('\0' == (char)pTemp[i])
                {
                   if (!tempString.IsEmpty())
                      Users->Add(tempString);

tempString = "";
                }
                else
                {
                   tempString = tempString + (char)pTemp[i];
                }
             } free(pTemp);
          }
       }
       catch(...)
       {
       }
    }
    else
    {
       RegSetValueEx(Reg->CurrentKey, "PrinterRights",
          NULL, REG_MULTI_SZ, NULL, 0);
    }
  }
  Reg->CloseKey();
  Reg->Free();

return true;
}

PrinterControl.h
//-----------------------------------------------------------------
ifndef PrinterControlH
define PrinterControlH
//-----------------------------------------------------------------
include <SysUtils.hpp>
include <Controls.hpp>
include <Classes.hpp>
include <Forms.hpp>
include <winspool.h>
```

FIG. 6-13

```cpp
include <stdio.h>
include <iostream.h>
include <fstream.h>
include <StUtils.hpp>
include <RegTools.h>
include "..\\DDK\\Inc\\winsplp.h"

define CONTROL_FULL       1
define TEMP_BUFFER_SIZE 128000

//---------------------------------------------------------------------------
class PACKAGE TPrinterControl : public TComponent
{
private:
    static AnsiString CleanupFilename(AnsiString Filename);

protected:

PRINTER_INFO_2 *SelectedPrinterInfo;
    DWORD SelectedPrinterInfoSize;
    AnsiString PrtInfoPath;
    AnsiString PrinterName;
    AnsiString PortMonitorDescription;
    AnsiString NewPrinterName;
    AnsiString SourceServerName;
    AnsiString NewPortName;
    AnsiString NewPortMonitor;
    DWORD dwDevModeSize;

DRIVER_INFO_3 *GetRemoteDriverInfo(AnsiString ServerName,
        AnsiString DriverName);
    TStringList *CopyDriverFiles(TStringList *SourceFiles);
    bool ValidateDriver(AnsiString DriverName);
    bool ValidatePort(AnsiString PortName, AnsiString PortMonitor);
    bool ValidateMonitor(AnsiString MonitorName);
    bool PrinterSetOwnerOnlyRights(AnsiString PrinterName);
    bool PrinterSetCurrentUserOnlyRights(AnsiString PrinterName);
    bool PrinterAddAccessRights(AnsiString PrinterName, AnsiString UserName, int nAccess);
    bool WritePrinterInfo(AnsiString FileToSaveTo);
    bool ReadPrinterInfo(AnsiString FileToReadFrom);
    bool SaveLocalPrinter();
    bool CreateLocalPrinter();
    bool SetDefaultPrinter();
    AnsiString GetIcaClientPort(AnsiString OldPort);
    AnsiString GetPortMonitor(AnsiString PortName);

public:
    __fastcall TPrinterControl(AnsiString PathToPrinterInfoFiles,
            AnsiString SourceServerNameForDrivers);
    __fastcall ~TPrinterControl();

bool PrinterAddAccessRights(AnsiString PrinterName, TStringList *Users, int nAccess);
    bool SetDefaultPrinter(AnsiString PrinterToSetAsDefault);
    bool CreateLocalPrinter(AnsiString PrinterToCreate);
    bool CreateLocalPrinter(AnsiString PrinterToCreate,
```

FIG. 6-14

```
        AnsiString NewPrinterToCreate);
    bool CreateLocalPrinter(AnsiString PrinterToCreate,
        AnsiString NewPrinterToCreate, TStringList *Users);
    bool SaveLocalPrinter(AnsiString PrinterToSave, AnsiString SaveName);
    bool SaveLocalPrinter(AnsiString PrinterToSave);
    bool RemapPort(AnsiString Port, AnsiString Monitor);
    bool PrinterPropertiesDialog(AnsiString PrinterName, HANDLE hWnd);
    bool DeleteLocalPrinter(AnsiString PrinterName);
    static PRINTER_INFO_2 *GetPrinterInfo2(AnsiString PrinterName);
    AnsiString GetStatusString(DWORD dwStatus);
    TStringList *GetLocalDrivers();
    TStringList *GetLocalPrinters();
    TStringList *GetNetworkPrinters();
    TStringList *GetLocalMonitors();
    TStringList *GetLocalPorts();
    TStringList *GetConfigFileList();
    TStringList *LoadPrinterInfoFromFile(AnsiString PrinterName);
    AnsiString GetDefaultPrinter();

TStringList *Messages;
    bool DeletePrinterConfig(AnsiString PrinterConfigName);
    AnsiString GetPrinterShareName(AnsiString PrinterName);
    AnsiString GetPrinterFullName(AnsiString PrinterName);
    bool ClearNetworkPrinters();
    bool SetIcaPrinterRights();
    bool CopyConfiguration(AnsiString Source, AnsiString Destination);
    bool SaveLocalDriver(AnsiString DriverName);

__published:
};
//---------------------------------------------------------------------
endif PrinterControl.Cpp
//---------------------------------------------------------------------
include <vcl.h>
pragma hdrstop
pragma warn -aus include "PrinterControl.h"
pragma package(smart_init)

typedef bool (*ADDPORTEX)(LPWSTR, DWORD, LPBYTE, LPWSTR);

//---------------------------------------------------------------------
// ValidCtrCheck is used to assure that the components created do not have
// any pure virtual functions.
// static inline void ValidCtrCheck(TPrinterControl *)
{
    new TPrinterControl(NULL, NULL);
}
//---------------------------------------------------------------------

__fastcall TPrinterControl::TPrinterControl(AnsiString PathToPrinterInfoFiles,
```

FIG. 6-15

```
    AnsiString SourceServerNameForDrivers)
  : TComponent(NULL)
{
  SelectedPrinterInfo = new PRINTER_INFO_2;
  ZeroMemory(SelectedPrinterInfo, sizeof(*SelectedPrinterInfo));

PrtInfoPath = PathToPrinterInfoFiles;

if (SourceServerNameForDrivers.IsEmpty())
  {
    SourceServerName = "\\\\";
    SourceServerName = SourceServerName + getenv("COMPUTERNAME");
  }
  else if (0 == SourceServerNameForDrivers.SubString(0, 2).AnsiCompareIC("\\\\"))
  {
    SourceServerName = "\\\\" + SourceServerNameForDrivers;
  }
  else
  {
    SourceServerName = SourceServerNameForDrivers;
  }

Messages = new TStringList;
}

__fastcall TPrinterControl::~TPrinterControl()
{
  if (SelectedPrinterInfo)
     free(SelectedPrinterInfo);
  SelectedPrinterInfo = NULL;
  Messages->Free();
}

//----------------------------------------------------------------
namespace Printercontrol
{
  void __fastcall PACKAGE Register()
  {
    TComponentClass classes[1] = {__classid(TPrinterControl)};
    RegisterComponents("Tricerat", classes, 0);
  }
}
//----------------------------------------------------------------

TStringList *TPrinterControl::GetLocalDrivers()
{
  TStringList *LocalDriverList = new TStringList;
  DRIVER_INFO_3 *InstalledDriverInfo = new DRIVER_INFO_3;
  DWORD InstalledDriverInfoReturned;
  DWORD dwSize;
  DWORD dwNeeded;
  int i;

EnumPrinterDrivers(NULL, NULL, 3, (unsigned char*)InstalledDriverInfo,
     0, &dwSize, &InstalledDriverInfoReturned);

InstalledDriverInfo = (DRIVER_INFO_3*)malloc(dwSize);
```

FIG. 6-16

```
    ZeroMemory(InstalledDriverInfo, dwSize);

if (!EnumPrinterDrivers(NULL, NULL, 3, (unsigned char*)InstalledDriverInfo,
        dwSize, &dwNeeded, &InstalledDriverInfoReturned))
    {
        Messages->Add("EnumPrinterDrivers() Failed!");
    } i = -1;
    LocalDriverList->Clear();
    while ((int)InstalledDriverInfoReturned > ++i)
        LocalDriverList->Add(InstalledDriverInfo[i].pName);

free(InstalledDriverInfo);
    return LocalDriverList;
}

TStringList *TPrinterControl::GetLocalPrinters()
{
    TStringList *LocalPrinterList = new TStringList;
    PRINTER_INFO_2 *InstalledPrinterInfo = new PRINTER_INFO_2;
    DWORD InstalledPrinterInfoReturned;
    DWORD dwSize;
    DWORD dwNeeded;
    int i;

EnumPrinters(PRINTER_ENUM_LOCAL, NULL, 2,(BYTE*)InstalledPrinterInfo,
        0, &dwSize, &InstalledPrinterInfoReturned);

InstalledPrinterInfo = (PRINTER_INFO_2*)malloc(dwSize);
    ZeroMemory(InstalledPrinterInfo, dwSize);

if (!EnumPrinters(PRINTER_ENUM_LOCAL, NULL, 2,(BYTE*)InstalledPrinterInfo,
        dwSize, &dwNeeded, &InstalledPrinterInfoReturned))
    {
        Messages->Add("EnumPrinters() Failed!");
    } i = -1;
    LocalPrinterList->Clear();
    while ((int)InstalledPrinterInfoReturned > ++i)
        LocalPrinterList->Add(InstalledPrinterInfo[i].pPrinterName);

free(InstalledPrinterInfo);
    return LocalPrinterList;
}

TStringList *TPrinterControl::GetNetworkPrinters()
{
    TStringList *NetworkPrinterList = new TStringList;
    PRINTER_INFO_2 *InstalledPrinterInfo = new PRINTER_INFO_2;
    DWORD InstalledPrinterInfoReturned;
    DWORD dwSize;
    DWORD dwNeeded;
    int i;
```

FIG. 6-17

```
EnumPrinters(PRINTER_ENUM_CONNECTIONS, NULL, 2,(BYTE*)InstalledPrinterInfo,
    0, &dwSize, &InstalledPrinterInfoReturned);

InstalledPrinterInfo = (PRINTER_INFO_2*)malloc(dwSize);
    ZeroMemory(InstalledPrinterInfo, dwSize);

if (!EnumPrinters(PRINTER_ENUM_CONNECTIONS, NULL, 2,(BYTE*)InstalledPrinterInfo,
    dwSize, &dwNeeded, &InstalledPrinterInfoReturned))
{
    Messages->Add("EnumPrinters() Failed!");
} i = -1;
NetworkPrinterList->Clear();
while ((int)InstalledPrinterInfoReturned > ++i)
    NetworkPrinterList->Add(InstalledPrinterInfo[i].pPrinterName);

free(InstalledPrinterInfo);
return NetworkPrinterList;
}

AnsiString TPrinterControl::GetDefaultPrinter()
{
    char szPrinter[256];
    AnsiString DefaultPrinter;
    int nDelim;

GetProfileString ("windows", "device", "", szPrinter, sizeof(szPrinter));
    DefaultPrinter = szPrinter;

nDelim = DefaultPrinter.Pos(",");

DefaultPrinter = DefaultPrinter.SubString(1, nDelim - 1);

return DefaultPrinter;
}

TStringList *TPrinterControl::GetLocalMonitors()
{
    MONITOR_INFO_2 *pLocalMonitors = new MONITOR_INFO_2;
    TStringList *LocalMonitors = new TStringList;
    DWORD dwSize;
    DWORD dwBytesNeeded;
    DWORD dwReturned;
    int i;

//Get the memory needed.
    EnumMonitors(NULL, 2, NULL, 0, &dwSize, &dwReturned);
    pLocalMonitors = (MONITOR_INFO_2*)malloc(dwSize);

if (!EnumMonitors(NULL, 2, (unsigned char*)pLocalMonitors, dwSize, &dwBytesNeeded,
        &dwReturned))
    {
        Messages->Add("EnumMonitors() Failed!");
    }
```

FIG. 6-18

```
  i = -1;
  while ((int)dwReturned > ++i)
     LocalMonitors->Add(pLocalMonitors[i].pName);

free(pLocalMonitors);

return LocalMonitors;
}

TStringList *TPrinterControl::GetLocalPorts()
{
  PORT_INFO_1 *pLocalPorts = new PORT_INFO_1;
  TStringList *LocalPorts = new TStringList;
  DWORD dwSize;
  DWORD dwReturned;
  DWORD dwBytesNeeded;
  int i;

EnumPorts(NULL, 1, (unsigned char*)pLocalPorts, 0, &dwSize, &dwReturned);
  pLocalPorts = (PORT_INFO_1*)malloc(dwSize);

if(!EnumPorts(NULL, 1, (unsigned char*)pLocalPorts, dwSize, &dwBytesNeeded,
     &dwReturned))
  {
     Messages->Add("EnumPorts() Failed!");
  } i = -1;
  while ((int)dwReturned > ++i)
     LocalPorts->Add(pLocalPorts[i].pName);

free(pLocalPorts);

return LocalPorts;
}

AnsiString TPrinterControl::GetPortMonitor(AnsiString PortName)
{
  PORT_INFO_2 *pPortInfo = new PORT_INFO_2;
  DWORD dwBytesNeeded;
  DWORD dwSize;
  DWORD dwReturned;
  int i;
  AnsiString MonitorName;
  AnsiString LprPortPath;
  TRegistry *Reg = new TRegistry;

EnumPorts(NULL, 2, (unsigned char*)pPortInfo, 0, &dwSize, &dwReturned);

pPortInfo = (PORT_INFO_2*)malloc(dwSize);

if(!EnumPorts(NULL, 2, (unsigned char*)pPortInfo, dwSize, &dwBytesNeeded,
     &dwReturned))
  {
     Messages->Add("EnumPorts() Failed!");
  }
```

FIG. 6-19

```
i = -1;
while ((int)dwReturned > ++i)
{
   if (0 == stricmp(PortName.c_str(), pPortInfo[i].pPortName))
     MonitorName = pPortInfo[i].pDescription;
} free(pPortInfo);

if (MonitorName.IsEmpty())
{
   //Check for LPR Port.
   Reg->RootKey = HKEY_LOCAL_MACHINE;

LprPortPath = "SYSTEM\\CurrentControlSet\\Control\\Print\\";
   LprPortPath = LprPortPath + "Monitors\\LPR Port\\Ports\\";
   LprPortPath = LprPortPath + PortName;

if (Reg->OpenKey(LprPortPath, false))
      MonitorName = "LPR Port";
}

Reg->CloseKey();

return MonitorName;
} bool TPrinterControl::SetDefaultPrinter(AnsiString PrinterToSetAsDefault)
{
   PrinterName = PrinterToSetAsDefault;
   if (!SetDefaultPrinter())
   {
      Messages->Add("SetDefaultPrinter() Failed!");
      return false;
   } return true;
} bool TPrinterControl::SetDefaultPrinter()
{
        HANDLE hPrinter;
        DWORD dwNeeded, dwReturned;
        PRINTER_INFO_2* pPrtInfo;
        char szTemp[256];
   AnsiString szPort;

//Open handle to printer.
        if(!OpenPrinter(PrinterName.c_str(),&hPrinter,NULL))
   {
      Messages->Add("OpenPrinter() Failed!");
      return false;
   }

//Select the default printer.
```

FIG. 6-20

```
        if(NULL!=hPrinter){

// Get the buffer size needed
                GetPrinter(hPrinter,2,NULL,0,&dwNeeded);

pPrtInfo=(PRINTER_INFO_2*)malloc(dwNeeded);
        ZeroMemory(pPrtInfo, dwNeeded);

//get the printer info
                GetPrinter(hPrinter,2,(unsigned char*)pPrtInfo,dwNeeded,&dwReturned);

szPort=pPrtInfo->pPortName;

//Set the default printer.
        sprintf(szTemp,"%s,WINSPOOL,%s", PrinterName.c_str(), szPort.c_str());
        WriteProfileString("windows","device",szTemp);
                SendNotifyMessage(HWND_BROADCAST, WM_WININICHANGE, 0, 0L);

//Close the handle to the printer.
                ClosePrinter(hPrinter);
        } free(pPrtInfo);

return true;
} bool TPrinterControl::WritePrinterInfo(AnsiString FileToSaveTo)
{
  HANDLE hFile;
  DWORD dwBytesWritten;
  DWORD dwServerNameSize,
        dwPrinterNameSize,
        dwShareNameSize,
        dwPortNameSize,
        dwDriverNameSize,
        dwCommentSize,
        dwLocationSize,
        dwSepFileSize,
        dwPrintProcessorSize,
        dwDatatypeSize,
        dwParametersSize,
        dwPortMonitorSize;

hFile = CreateFile(FileToSaveTo.c_str(), GENERIC_WRITE, NULL, NULL,
        CREATE_ALWAYS, FILE_ATTRIBUTE_NORMAL, NULL);

if (NULL == hFile)
  {
    Messages->Add("CreateFile() Failed!");
    return false;
  }

PortMonitorDescription = GetPortMonitor(SelectedPrinterInfo->pPortName);

//Set the port to Local if not recognized.
```

FIG. 6-21

```
if (PortMonitorDescription.IsEmpty())
{
  PortMonitorDescription = "Local Port";
  SelectedPrinterInfo->pPortName = "LPT1:";
}

SetFilePointer(hFile, 0, 0, FILE_BEGIN);

//dwServerNameSize
if (NULL == SelectedPrinterInfo->pServerName)
  dwServerNameSize = 0;
else
  dwServerNameSize = strlen(SelectedPrinterInfo->pServerName);

//dwPrinterNameSize
if (NULL == SelectedPrinterInfo->pPrinterName)
  dwPrinterNameSize = 0;
else
  dwPrinterNameSize = strlen(SelectedPrinterInfo->pPrinterName);

//dwShareNameSize
if (NULL == SelectedPrinterInfo->pShareName)
  dwShareNameSize = 0;
else
  dwShareNameSize = strlen(SelectedPrinterInfo->pShareName);

//dwPortNameSize
if (NULL == SelectedPrinterInfo->pPortName)
  dwPortNameSize = 0;
else
  dwPortNameSize = strlen(SelectedPrinterInfo->pPortName);

//dwDriverNameSize
if (NULL == SelectedPrinterInfo->pDriverName)
  dwDriverNameSize = 0;
else
  dwDriverNameSize = strlen(SelectedPrinterInfo->pDriverName);

//dwCommentSize
if (NULL == SelectedPrinterInfo->pComment)
  dwCommentSize = 0;
else
  dwCommentSize = strlen(SelectedPrinterInfo->pComment);

//dwLocationSize
if (NULL == SelectedPrinterInfo->pLocation)
  dwLocationSize = 0;
else
  dwLocationSize = strlen(SelectedPrinterInfo->pLocation);

//dwSepFileSize
if (NULL == SelectedPrinterInfo->pSepFile)
  dwSepFileSize = 0;
else
  dwSepFileSize = strlen(SelectedPrinterInfo->pSepFile);

//dwPrintProcessorSize
```

FIG. 6-22

```
if (NULL == SelectedPrinterInfo->pPrintProcessor)
   dwPrintProcessorSize = 0;
else
   dwPrintProcessorSize = strlen(SelectedPrinterInfo->pPrintProcessor);

//dwDatatypeSize
if (NULL == SelectedPrinterInfo->pDatatype)
   dwDatatypeSize = 0;
else
   dwDatatypeSize = strlen(SelectedPrinterInfo->pDatatype);

//dwParametersSize
if (NULL == SelectedPrinterInfo->pParameters)
   dwParametersSize = 0;
else
dwParametersSize = strlen(SelectedPrinterInfo->pParameters);

//dwPortMonitorSize
if (PortMonitorDescription.IsEmpty())
   dwPortMonitorSize = 0;
else
dwPortMonitorSize = strlen(PortMonitorDescription.c_str());

//Increment the sizes to account for null terminators.
dwServerNameSize++;
dwPrinterNameSize++;
dwShareNameSize++;
dwPortNameSize++;
dwDriverNameSize++;
dwCommentSize++;
dwLocationSize++;
dwSepFileSize++;
dwPrintProcessorSize++;
dwDatatypeSize++;
dwParametersSize++;
dwPortMonitorSize++;

//Write the header.

//dwSelectedPrinterInfoSize
WriteFile(hFile, (char*)&SelectedPrinterInfoSize,
   sizeof(DWORD), &dwBytesWritten, NULL);

//dwServerNameSize
WriteFile(hFile, (char*)&dwServerNameSize,
   sizeof(DWORD), &dwBytesWritten, NULL);

//dwPrinterNameSize
WriteFile(hFile, (char*)&dwPrinterNameSize,
   sizeof(DWORD), &dwBytesWritten, NULL);

//dwShareNameSize
WriteFile(hFile, (char*)&dwShareNameSize,
   sizeof(DWORD), &dwBytesWritten, NULL);

//dwPortNameSize
```

FIG. 6-23

```
WriteFile(hFile, (char*)&dwPortNameSize,
   sizeof(DWORD), &dwBytesWritten, NULL);

//dwDriverNameSize
WriteFile(hFile, (char*)&dwDriverNameSize,
   sizeof(DWORD), &dwBytesWritten, NULL);

//dwCommentSize
WriteFile(hFile, (char*)&dwCommentSize,
   sizeof(DWORD), &dwBytesWritten, NULL);

//dwLocationSize
WriteFile(hFile, (char*)&dwLocationSize,
   sizeof(DWORD), &dwBytesWritten, NULL);

//dwSepFileSize
WriteFile(hFile, (char*)&dwSepFileSize,
   sizeof(DWORD), &dwBytesWritten, NULL);

//dwPrintProcessorSize
WriteFile(hFile, (char*)&dwPrintProcessorSize,
   sizeof(DWORD), &dwBytesWritten, NULL);

//dwDatatypeSize
WriteFile(hFile, (char*)&dwDatatypeSize,
   sizeof(DWORD), &dwBytesWritten, NULL);

//dwParametersSize
WriteFile(hFile, (char*)&dwParametersSize,
   sizeof(DWORD), &dwBytesWritten, NULL);

//dwPortMonitorSize
WriteFile(hFile, (char*)&dwPortMonitorSize,
   sizeof(DWORD), &dwBytesWritten, NULL);

//Write the data.

//pServerName
if (NULL == SelectedPrinterInfo->pServerName)
   WriteFile(hFile, (char*)"",
      dwServerNameSize, &dwBytesWritten, NULL);
else
   WriteFile(hFile, (char*)SelectedPrinterInfo->pServerName,
      dwServerNameSize, &dwBytesWritten, NULL);

//pPrinterName
if (NULL == SelectedPrinterInfo->pPrinterName)
   WriteFile(hFile, (char*)"",
      dwPrinterNameSize, &dwBytesWritten, NULL);
else
   WriteFile(hFile, (char*)SelectedPrinterInfo->pPrinterName,
      dwPrinterNameSize, &dwBytesWritten, NULL);

//pShareName
if (NULL == SelectedPrinterInfo->pShareName)
   WriteFile(hFile, (char*)"",
      dwShareNameSize, &dwBytesWritten, NULL);
```

FIG. 6-24

```
else
   WriteFile(hFile, (char*)SelectedPrinterInfo->pShareName,
      dwShareNameSize, &dwBytesWritten, NULL);

//pPortName
if (NULL == SelectedPrinterInfo->pPortName)
   WriteFile(hFile, (char*)"",
      dwPortNameSize, &dwBytesWritten, NULL);
else
   WriteFile(hFile, (char*)SelectedPrinterInfo->pPortName,
      dwPortNameSize, &dwBytesWritten, NULL);

//pDriverName
if (NULL == SelectedPrinterInfo->pDriverName)
   WriteFile(hFile, (char*)"",
      dwDriverNameSize, &dwBytesWritten, NULL);
else
   WriteFile(hFile, (char*)SelectedPrinterInfo->pDriverName,
      dwDriverNameSize, &dwBytesWritten, NULL);

//pComment
if (NULL == SelectedPrinterInfo->pComment)
   WriteFile(hFile, (char*)"",
      dwCommentSize, &dwBytesWritten, NULL);
else
   WriteFile(hFile, (char*)SelectedPrinterInfo->pComment,
      dwCommentSize, &dwBytesWritten, NULL);

//pLocation
if (NULL == SelectedPrinterInfo->pLocation)
   WriteFile(hFile, (char*)"",
      dwLocationSize, &dwBytesWritten, NULL);
else
   WriteFile(hFile, (char*)SelectedPrinterInfo->pLocation,
      dwLocationSize, &dwBytesWritten, NULL);

//pSepFile
if (NULL == SelectedPrinterInfo->pSepFile)
   WriteFile(hFile, (char*)"",
      dwSepFileSize, &dwBytesWritten, NULL);
else
   WriteFile(hFile, (char*)SelectedPrinterInfo->pSepFile,
      dwSepFileSize, &dwBytesWritten, NULL);

//pPrintProcessor
if (NULL == SelectedPrinterInfo->pPrintProcessor)
   WriteFile(hFile, (char*)"",
      dwPrintProcessorSize, &dwBytesWritten, NULL);
else
   WriteFile(hFile, (char*)SelectedPrinterInfo->pPrintProcessor,
      dwPrintProcessorSize, &dwBytesWritten, NULL);

//pDatatype
if (NULL == SelectedPrinterInfo->pDatatype)
   WriteFile(hFile, (char*)"",
      dwDatatypeSize, &dwBytesWritten, NULL);
else
```

FIG. 6-25

```
    WriteFile(hFile, (char*)SelectedPrinterInfo->pDatatype,
        dwDatatypeSize, &dwBytesWritten, NULL);

//pParameters
if (NULL == SelectedPrinterInfo->pParameters)
    WriteFile(hFile, (char*)"",
        dwParametersSize, &dwBytesWritten, NULL);
else
    WriteFile(hFile, (char*)SelectedPrinterInfo->pParameters,
        dwParametersSize, &dwBytesWritten, NULL);

//pPortMonitorName
if (PortMonitorDescription.IsEmpty())
    WriteFile(hFile, (char*)"",
        dwPortMonitorSize, &dwBytesWritten, NULL);
else
    WriteFile(hFile, (char*)PortMonitorDescription.c_str(),
        dwPortMonitorSize, &dwBytesWritten, NULL);

//Attributes
WriteFile(hFile, (CHAR*)&SelectedPrinterInfo->Attributes,
    sizeof(DWORD), &dwBytesWritten, NULL);

//Priority
WriteFile(hFile, (char*)&SelectedPrinterInfo->Priority,
    sizeof(DWORD), &dwBytesWritten, NULL);

//DefaultPriority
WriteFile(hFile, (char*)&SelectedPrinterInfo->DefaultPriority,
    sizeof(DWORD), &dwBytesWritten, NULL);

//StartTime
WriteFile(hFile, (char*)&SelectedPrinterInfo->StartTime,
    sizeof(DWORD), &dwBytesWritten, NULL);

//UntilTime
WriteFile(hFile, (char*)&SelectedPrinterInfo->UntilTime,
    sizeof(DWORD), &dwBytesWritten, NULL);

//Status
WriteFile(hFile, (char*)&SelectedPrinterInfo->Status,
    sizeof(DWORD), &dwBytesWritten, NULL);

//cJobs
WriteFile(hFile, (char*)&SelectedPrinterInfo->cJobs,
    sizeof(DWORD), &dwBytesWritten, NULL);

//AveragePPM
WriteFile(hFile, (char*)&SelectedPrinterInfo->AveragePPM,
    sizeof(DWORD), &dwBytesWritten, NULL);

//Now write the DevMode structure.

//Entire structure size.
WriteFile(hFile, (char*)&dwDevModeSize,
    sizeof(DWORD), &dwBytesWritten, NULL);
```

FIG. 6-26

```
//dmSize
WriteFile(hFile, (char*)&SelectedPrinterInfo->pDevMode->dmSize,
    sizeof(WORD), &dwBytesWritten, NULL);

//dmDeviceName[32]
WriteFile(hFile, (char*)SelectedPrinterInfo->pDevMode->dmDeviceName,
    CCHDEVICENAME, &dwBytesWritten, NULL);

//dmSpecVersion
WriteFile(hFile, (char*)&SelectedPrinterInfo->pDevMode->dmSpecVersion,
    sizeof(WORD), &dwBytesWritten, NULL);

//dmDriverVersion
WriteFile(hFile, (char*)&SelectedPrinterInfo->pDevMode->dmDriverVersion,
    sizeof(WORD), &dwBytesWritten, NULL);

//dmDriverExtra
WriteFile(hFile, (char*)&SelectedPrinterInfo->pDevMode->dmDriverExtra,
    sizeof(WORD), &dwBytesWritten, NULL);

//dmFields
WriteFile(hFile, (char*)&SelectedPrinterInfo->pDevMode->dmFields,
    sizeof(DWORD), &dwBytesWritten, NULL);

//dmOrientation
WriteFile(hFile, (char*)&SelectedPrinterInfo->pDevMode->dmOrientation,
    sizeof(short), &dwBytesWritten, NULL);

//dmPaperSize
WriteFile(hFile, (char*)&SelectedPrinterInfo->pDevMode->dmPaperSize,
    sizeof(short), &dwBytesWritten, NULL);

//dmPaperLength
WriteFile(hFile, (char*)&SelectedPrinterInfo->pDevMode->dmPaperLength,
    sizeof(short), &dwBytesWritten, NULL);

//dmPaperWidth
WriteFile(hFile, (char*)&SelectedPrinterInfo->pDevMode->dmPaperWidth,
    sizeof(short), &dwBytesWritten, NULL);

//dmScale
WriteFile(hFile, (char*)&SelectedPrinterInfo->pDevMode->dmScale,
    sizeof(short), &dwBytesWritten, NULL);

//dmCopies
WriteFile(hFile, (char*)&SelectedPrinterInfo->pDevMode->dmCopies,
    sizeof(short), &dwBytesWritten, NULL);

//dmDefaultSource
WriteFile(hFile, (char*)&SelectedPrinterInfo->pDevMode->dmDefaultSource,
    sizeof(short), &dwBytesWritten, NULL);

//dmPrintQuality
WriteFile(hFile, (char*)&SelectedPrinterInfo->pDevMode->dmPrintQuality,
    sizeof(short), &dwBytesWritten, NULL);

//dmColor
```

FIG. 6-27

```
    WriteFile(hFile, (char*)&SelectedPrinterInfo->pDevMode->dmColor,
        sizeof(short), &dwBytesWritten, NULL);

//dmDuplex
    WriteFile(hFile, (char*)&SelectedPrinterInfo->pDevMode->dmDuplex,
        sizeof(short), &dwBytesWritten, NULL);

//dmYResolution
    WriteFile(hFile, (char*)&SelectedPrinterInfo->pDevMode->dmYResolution,
        sizeof(short), &dwBytesWritten, NULL);

//dmTTOption
    WriteFile(hFile, (char*)&SelectedPrinterInfo->pDevMode->dmTTOption,
        sizeof(short), &dwBytesWritten, NULL);

//dmCollate
    WriteFile(hFile, (char*)&SelectedPrinterInfo->pDevMode->dmCollate,
        sizeof(short), &dwBytesWritten, NULL);

//dmFormName[32]
    WriteFile(hFile, (char*)SelectedPrinterInfo->pDevMode->dmFormName,
        CCHFORMNAME, &dwBytesWritten, NULL);

//dmBitsPerPel
    WriteFile(hFile, (char*)&SelectedPrinterInfo->pDevMode->dmBitsPerPel,
        sizeof(USHORT), &dwBytesWritten, NULL);

//dmPelsWidth
    WriteFile(hFile, (char*)&SelectedPrinterInfo->pDevMode->dmPelsWidth,
        sizeof(DWORD), &dwBytesWritten, NULL);

//dmPelsHeight
    WriteFile(hFile, (char*)&SelectedPrinterInfo->pDevMode->dmPelsHeight,
        sizeof(DWORD), &dwBytesWritten, NULL);

//dmDisplayFlags
    WriteFile(hFile, (char*)&SelectedPrinterInfo->pDevMode->dmDisplayFlags,
        sizeof(DWORD), &dwBytesWritten, NULL);

//dmDisplayFrequency
    WriteFile(hFile, (char*)&SelectedPrinterInfo->pDevMode->dmDisplayFrequency,
        sizeof(DWORD), &dwBytesWritten, NULL);

CloseHandle(hFile);

return true;
} bool TPrinterControl::ReadPrinterInfo(AnsiString FileToReadFrom)
{
    HANDLE hFile;
    DWORD dwBytesRead;
    DWORD dwServerNameSize,
        dwPrinterNameSize,
        dwShareNameSize,
        dwPortNameSize,
        dwDriverNameSize,
```

FIG. 6-28

```
        dwCommentSize,
        dwLocationSize,
        dwSepFileSize,
        dwPrintProcessorSize,
        dwDatatypeSize,
        dwParametersSize,
        dwPortMonitorSize;
void *pPortMonitorName;

hFile = CreateFile(FileToReadFrom.c_str(), GENERIC_READ,
       FILE_SHARE_READ, NULL, OPEN_EXISTING, FILE_ATTRIBUTE_NORMAL, NULL);

if (NULL == hFile)
    {
      Messages->Add("CreateFile() Failed!");
       return false;
    }

SetFilePointer(hFile, 0, 0, FILE_BEGIN);

//PrinterInfoSize
SelectedPrinterInfoSize = 0;
ReadFile(hFile, (char*)&SelectedPrinterInfoSize,
    sizeof(DWORD), &dwBytesRead, NULL);

//dwServerNameSize
dwServerNameSize = 0;
ReadFile(hFile, (char*)&dwServerNameSize,
    sizeof(DWORD), &dwBytesRead, NULL);

//dwPrinterNameSize
dwPrinterNameSize = 0;
ReadFile(hFile, (char*)&dwPrinterNameSize,
    sizeof(DWORD), &dwBytesRead, NULL);

//dwShareNameSize
dwShareNameSize = 0;
ReadFile(hFile, (char*)&dwShareNameSize,
    sizeof(DWORD), &dwBytesRead, NULL);

//dwPortNameSize
dwPortNameSize = 0;
ReadFile(hFile, (char*)&dwPortNameSize,
    sizeof(DWORD), &dwBytesRead, NULL);

//dwDriverNameSize
dwDriverNameSize = 0;
ReadFile(hFile, (char*)&dwDriverNameSize,
    sizeof(DWORD), &dwBytesRead, NULL);

//dwCommentSize
dwCommentSize = 0;
ReadFile(hFile, (char*)&dwCommentSize,
    sizeof(DWORD), &dwBytesRead, NULL);

//dwLocationSize
dwLocationSize = 0;
```

FIG. 6-29

```
ReadFile(hFile, (char*)&dwLocationSize,
    sizeof(DWORD), &dwBytesRead, NULL);

//dwSepFileSize
dwSepFileSize = 0;
ReadFile(hFile, (char*)&dwSepFileSize,
    sizeof(DWORD), &dwBytesRead, NULL);

//dwPrintProcessorSize
dwPrintProcessorSize = 0;
ReadFile(hFile, (char*)&dwPrintProcessorSize,
    sizeof(DWORD), &dwBytesRead, NULL);

//dwDatatypeSize
dwDatatypeSize = 0;
ReadFile(hFile, (char*)&dwDatatypeSize,
    sizeof(DWORD), &dwBytesRead, NULL);

//dwParametersSize
dwParametersSize = 0;
ReadFile(hFile, (char*)&dwParametersSize,
    sizeof(DWORD), &dwBytesRead, NULL);

//dwPortMonitorSize
dwPortMonitorSize = 0;
ReadFile(hFile, (char*)&dwPortMonitorSize,
    sizeof(DWORD), &dwBytesRead, NULL);

free(SelectedPrinterInfo);
SelectedPrinterInfo = NULL;
SelectedPrinterInfo = (PRINTER_INFO_2*)malloc(SelectedPrinterInfoSize);
ZeroMemory(SelectedPrinterInfo, SelectedPrinterInfoSize);

SelectedPrinterInfo->pServerName = NULL;
SelectedPrinterInfo->pServerName = (LPTSTR)malloc(dwServerNameSize);
ZeroMemory(SelectedPrinterInfo->pServerName, dwServerNameSize);

SelectedPrinterInfo->pPrinterName = NULL;
SelectedPrinterInfo->pPrinterName = (LPTSTR)malloc(dwPrinterNameSize);
ZeroMemory(SelectedPrinterInfo->pPrinterName, dwPrinterNameSize);

SelectedPrinterInfo->pShareName = NULL;
SelectedPrinterInfo->pShareName = (LPTSTR)malloc(dwShareNameSize);
ZeroMemory(SelectedPrinterInfo->pShareName, dwShareNameSize);

SelectedPrinterInfo->pPortName = NULL;
SelectedPrinterInfo->pPortName = (LPTSTR)malloc(dwPortNameSize);
ZeroMemory(SelectedPrinterInfo->pPortName, dwPortNameSize);

SelectedPrinterInfo->pDriverName = NULL;
SelectedPrinterInfo->pDriverName = (LPTSTR)malloc(dwDriverNameSize);
ZeroMemory(SelectedPrinterInfo->pDriverName, dwDriverNameSize);

SelectedPrinterInfo->pComment = NULL;
SelectedPrinterInfo->pComment = (LPTSTR)malloc(dwCommentSize);
ZeroMemory(SelectedPrinterInfo->pComment, dwCommentSize);
```

FIG. 6-30

```
SelectedPrinterInfo->pLocation = NULL;
SelectedPrinterInfo->pLocation = (LPTSTR)malloc(dwLocationSize);
ZeroMemory(SelectedPrinterInfo->pLocation, dwLocationSize);

SelectedPrinterInfo->pSepFile = NULL;
SelectedPrinterInfo->pSepFile = (LPTSTR)malloc(dwSepFileSize);
ZeroMemory(SelectedPrinterInfo->pSepFile, dwSepFileSize);

SelectedPrinterInfo->pPrintProcessor = NULL;
SelectedPrinterInfo->pPrintProcessor = (LPTSTR)malloc(dwPrintProcessorSize);
ZeroMemory(SelectedPrinterInfo->pPrintProcessor, dwPrintProcessorSize);

SelectedPrinterInfo->pDatatype = NULL;
SelectedPrinterInfo->pDatatype = (LPTSTR)malloc(dwDatatypeSize);
ZeroMemory(SelectedPrinterInfo->pDatatype, dwDatatypeSize);

SelectedPrinterInfo->pParameters = NULL;
SelectedPrinterInfo->pParameters = (LPTSTR)malloc(dwParametersSize);
ZeroMemory(SelectedPrinterInfo->pParameters, dwParametersSize);

pPortMonitorName = NULL;
pPortMonitorName = malloc(dwPortMonitorSize);
ZeroMemory(pPortMonitorName, dwPortMonitorSize);

SelectedPrinterInfo->Attributes = (DWORD)malloc(sizeof(DWORD));
SelectedPrinterInfo->Attributes = 0;

SelectedPrinterInfo->Priority = (DWORD)malloc(sizeof(DWORD));
SelectedPrinterInfo->Priority = 0;

SelectedPrinterInfo->DefaultPriority = (DWORD)malloc(sizeof(DWORD));
SelectedPrinterInfo->DefaultPriority = 0;

SelectedPrinterInfo->StartTime = (DWORD)malloc(sizeof(DWORD));
SelectedPrinterInfo->StartTime = 0;

SelectedPrinterInfo->UntilTime = (DWORD)malloc(sizeof(DWORD));
SelectedPrinterInfo->UntilTime = 0;

SelectedPrinterInfo->Status = (DWORD)malloc(sizeof(DWORD));
SelectedPrinterInfo->Status = 0;

SelectedPrinterInfo->cJobs = (DWORD)malloc(sizeof(DWORD));
SelectedPrinterInfo->cJobs = 0;

SelectedPrinterInfo->AveragePPM = (DWORD)malloc(sizeof(DWORD));
SelectedPrinterInfo->AveragePPM = 0;

//pServerName
ReadFile(hFile, (char*)SelectedPrinterInfo->pServerName,
    dwServerNameSize, &dwBytesRead, NULL);

//pPrinterName
ReadFile(hFile, (char*)SelectedPrinterInfo->pPrinterName,
    dwPrinterNameSize, &dwBytesRead, NULL);

//pShareName
```

FIG. 6-31

```
ReadFile(hFile, (char*)SelectedPrinterInfo->pShareName,
    dwShareNameSize, &dwBytesRead, NULL);

//pPortName
ReadFile(hFile, (char*)SelectedPrinterInfo->pPortName,
    dwPortNameSize, &dwBytesRead, NULL);

//pDriverName
ReadFile(hFile, (char*)SelectedPrinterInfo->pDriverName,
    dwDriverNameSize, &dwBytesRead, NULL);

//pComment
ReadFile(hFile, (char*)SelectedPrinterInfo->pComment,
    dwCommentSize, &dwBytesRead, NULL);

//pLocation
ReadFile(hFile, (char*)SelectedPrinterInfo->pLocation,
    dwLocationSize, &dwBytesRead, NULL);

//pSepFile
ReadFile(hFile, (char*)SelectedPrinterInfo->pSepFile,
    dwSepFileSize, &dwBytesRead, NULL);

//pPrintProcessor
ReadFile(hFile, (char*)SelectedPrinterInfo->pPrintProcessor,
    dwPrintProcessorSize, &dwBytesRead, NULL);

//pDatatype
ReadFile(hFile, (char*)SelectedPrinterInfo->pDatatype,
    dwDatatypeSize, &dwBytesRead, NULL);

//pParameters
ReadFile(hFile, (char*)SelectedPrinterInfo->pParameters,
    dwParametersSize, &dwBytesRead, NULL);

//pPortMonitorName
ReadFile(hFile, (char*)pPortMonitorName,
    dwPortMonitorSize, &dwBytesRead, NULL);
PortMonitorDescription = (char*)pPortMonitorName;

//Attributes
ReadFile(hFile, (char*)&SelectedPrinterInfo->Attributes,
    sizeof(DWORD), &dwBytesRead, NULL);

//Priority
ReadFile(hFile, (char*)&SelectedPrinterInfo->Priority,
    sizeof(DWORD), &dwBytesRead, NULL);

//DefaultPriority
ReadFile(hFile, (char*)&SelectedPrinterInfo->DefaultPriority,
    sizeof(DWORD), &dwBytesRead, NULL);

//StartTime
ReadFile(hFile, (char*)&SelectedPrinterInfo->StartTime,
    sizeof(DWORD), &dwBytesRead, NULL);

//UntilTime
```

FIG. 6-32

```
ReadFile(hFile, (char*)&SelectedPrinterInfo->UntilTime,
    sizeof(DWORD), &dwBytesRead, NULL);

//Status
ReadFile(hFile, (char*)&SelectedPrinterInfo->Status,
    sizeof(DWORD), &dwBytesRead, NULL);

//cJobs
ReadFile(hFile, (char*)&SelectedPrinterInfo->cJobs,
    sizeof(DWORD), &dwBytesRead, NULL);

//AveragePPM
ReadFile(hFile, (char*)&SelectedPrinterInfo->AveragePPM,
    sizeof(DWORD), &dwBytesRead, NULL);

//Now read the DevMode Structure size.
ReadFile(hFile, (char*)&dwDevModeSize,
    sizeof(DWORD), &dwBytesRead, NULL);

//Allocate the DevMode structure members.
free(SelectedPrinterInfo->pDevMode);
SelectedPrinterInfo->pDevMode = NULL;
SelectedPrinterInfo->pDevMode = (DEVMODE*)malloc(dwDevModeSize);
ZeroMemory(SelectedPrinterInfo->pDevMode, dwDevModeSize);

ZeroMemory(SelectedPrinterInfo->pDevMode->dmDeviceName, CCHDEVICENAME);
ZeroMemory(SelectedPrinterInfo->pDevMode->dmFormName, CCHFORMNAME);

//dmSize
SelectedPrinterInfo->pDevMode->dmSize = 0;
ReadFile(hFile, (char*)&SelectedPrinterInfo->pDevMode->dmSize,
    sizeof(WORD), &dwBytesRead, NULL);

//dmDeviceName[32]
ReadFile(hFile, (char*)SelectedPrinterInfo->pDevMode->dmDeviceName,
    CCHDEVICENAME, &dwBytesRead, NULL);

//dmSpecVersion
SelectedPrinterInfo->pDevMode->dmSpecVersion = 0;
ReadFile(hFile, (char*)&SelectedPrinterInfo->pDevMode->dmSpecVersion,
    sizeof(WORD), &dwBytesRead, NULL);

//dmDriverVersion
SelectedPrinterInfo->pDevMode->dmDriverVersion = 0;
ReadFile(hFile, (char*)&SelectedPrinterInfo->pDevMode->dmDriverVersion,
    sizeof(WORD), &dwBytesRead, NULL);

//dmDriverExtra
SelectedPrinterInfo->pDevMode->dmDriverExtra = 0;
ReadFile(hFile, (char*)&SelectedPrinterInfo->pDevMode->dmDriverExtra,
    sizeof(WORD), &dwBytesRead, NULL);

//dmFields
SelectedPrinterInfo->pDevMode->dmFields = 0;
ReadFile(hFile, (char*)&SelectedPrinterInfo->pDevMode->dmFields,
    sizeof(DWORD), &dwBytesRead, NULL);
```

FIG. 6-33

```
//dmOrientation
SelectedPrinterInfo->pDevMode->dmOrientation = 0;
ReadFile(hFile, (char*)&SelectedPrinterInfo->pDevMode->dmOrientation,
    sizeof(short), &dwBytesRead, NULL);

//dmPaperSize
SelectedPrinterInfo->pDevMode->dmPaperSize = 0;
ReadFile(hFile, (char*)&SelectedPrinterInfo->pDevMode->dmPaperSize,
    sizeof(short), &dwBytesRead, NULL);

//dmPaperLength
SelectedPrinterInfo->pDevMode->dmPaperLength = 0;
ReadFile(hFile, (char*)&SelectedPrinterInfo->pDevMode->dmPaperLength,
    sizeof(short), &dwBytesRead, NULL);

//dmPaperWidth
SelectedPrinterInfo->pDevMode->dmPaperWidth = 0;
ReadFile(hFile, (char*)&SelectedPrinterInfo->pDevMode->dmPaperWidth,
    sizeof(short), &dwBytesRead, NULL);

//dmScale
SelectedPrinterInfo->pDevMode->dmScale = 0;
ReadFile(hFile, (char*)&SelectedPrinterInfo->pDevMode->dmScale,
    sizeof(short), &dwBytesRead, NULL);

//dmCopies
SelectedPrinterInfo->pDevMode->dmCopies = 0;
ReadFile(hFile, (char*)&SelectedPrinterInfo->pDevMode->dmCopies,
    sizeof(short), &dwBytesRead, NULL);

//dmDefaultSource
SelectedPrinterInfo->pDevMode->dmDefaultSource = 0;
ReadFile(hFile, (char*)&SelectedPrinterInfo->pDevMode->dmDefaultSource,
    sizeof(short), &dwBytesRead, NULL);

//dmPrintQuality
SelectedPrinterInfo->pDevMode->dmPrintQuality = 0;
ReadFile(hFile, (char*)&SelectedPrinterInfo->pDevMode->dmPrintQuality,
    sizeof(short), &dwBytesRead, NULL);

//dmColor
SelectedPrinterInfo->pDevMode->dmColor = 0;
ReadFile(hFile, (char*)&SelectedPrinterInfo->pDevMode->dmColor,
    sizeof(short), &dwBytesRead, NULL);

//dmDuplex
SelectedPrinterInfo->pDevMode->dmDuplex = 0;
ReadFile(hFile, (char*)&SelectedPrinterInfo->pDevMode->dmDuplex,
    sizeof(short), &dwBytesRead, NULL);

//dmYResolution
SelectedPrinterInfo->pDevMode->dmYResolution = 0;
ReadFile(hFile, (char*)&SelectedPrinterInfo->pDevMode->dmYResolution,
    sizeof(short), &dwBytesRead, NULL);

//dmTTOption
SelectedPrinterInfo->pDevMode->dmTTOption = 0;
```

FIG. 6-34

```
    ReadFile(hFile, (char*)&SelectedPrinterInfo->pDevMode->dmTTOption,
        sizeof(short), &dwBytesRead, NULL);

//dmCollate
SelectedPrinterInfo->pDevMode->dmCollate = 0;
ReadFile(hFile, (char*)&SelectedPrinterInfo->pDevMode->dmCollate,
    sizeof(short), &dwBytesRead, NULL);

//dmFormName[32]
ReadFile(hFile, (char*)SelectedPrinterInfo->pDevMode->dmFormName,
    CCHFORMNAME, &dwBytesRead, NULL);

//dmBitsPerPel
SelectedPrinterInfo->pDevMode->dmBitsPerPel = 0;
ReadFile(hFile, (char*)&SelectedPrinterInfo->pDevMode->dmBitsPerPel,
    sizeof(USHORT), &dwBytesRead, NULL);

//dmPelsWidth
SelectedPrinterInfo->pDevMode->dmPelsWidth = 0;
ReadFile(hFile, (char*)&SelectedPrinterInfo->pDevMode->dmPelsWidth,
    sizeof(DWORD), &dwBytesRead, NULL);

//dmPelsHeight
SelectedPrinterInfo->pDevMode->dmPelsHeight = 0;
ReadFile(hFile, (char*)&SelectedPrinterInfo->pDevMode->dmPelsHeight,
    sizeof(DWORD), &dwBytesRead, NULL);

//dmDisplayFlags
SelectedPrinterInfo->pDevMode->dmDisplayFlags = 0;
ReadFile(hFile, (char*)&SelectedPrinterInfo->pDevMode->dmDisplayFlags,
    sizeof(DWORD), &dwBytesRead, NULL);

//dmDisplayFrequency
SelectedPrinterInfo->pDevMode->dmDisplayFrequency = 0;
ReadFile(hFile, (char*)&SelectedPrinterInfo->pDevMode->dmDisplayFrequency,
    sizeof(DWORD), &dwBytesRead, NULL);

CloseHandle(hFile);
free(pPortMonitorName);
pPortMonitorName = NULL;

return true;
} bool TPrinterControl::SaveLocalPrinter(AnsiString PrinterToSave, AnsiString SaveName)
{
    PrinterName = PrinterToSave;
    NewPrinterName = SaveName;
    if (!SaveLocalPrinter())
    {
        Messages->Add("SaveLocalPrinter() Failed!");
        return false;
    } return true;
}
```

FIG. 6-35

```
bool TPrinterControl::SaveLocalPrinter(AnsiString PrinterToSave)
{
    PrinterName = PrinterToSave;
    NewPrinterName = PrinterToSave
    if(!SaveLocalPrinter())
    {
        Messages->Add("SaveLocalPrinter() Failed!");
        return false;
    } return true;
} bool TPrinterControl::SaveLocalPrinter()
{
        HANDLE hPrinter;
        DWORD dwReturned;
    AnsiString MonitorName;

NewPrinterName = CleanupFilename(NewPrinterName);

//Open handle to printer.
        if( 0 == OpenPrinter(PrinterName.c_str(),&hPrinter,NULL))
    {
        Messages->Add("OpenPrinter() Failed!");
        return false;
    }

//Select the default printer.
        if(NULL == hPrinter)
    {
        Messages->Add("NULL Printer Handle!");
    }

// Get the buffer size needed
    GetPrinter(hPrinter,2,NULL,0,&SelectedPrinterInfoSize);

free(SelectedPrinterInfo);
        SelectedPrinterInfo = (PRINTER_INFO_2*)malloc(SelectedPrinterInfoSize);
    ZeroMemory(SelectedPrinterInfo, SelectedPrinterInfoSize);

//get the printer info
    if(!GetPrinter(hPrinter, 2, (unsigned char*)SelectedPrinterInfo,
        SelectedPrinterInfoSize, &dwReturned))
    {
        Messages->Add("GetPrinter() Failed!");
    }

//Get the DevMode structure
    dwDevModeSize = DocumentProperties(NULL, hPrinter,
        PrinterName.c_str(), NULL, NULL, 0);

SelectedPrinterInfo->pDevMode = (DEVMODE*)malloc(dwDevModeSize);

DocumentProperties(NULL, hPrinter, PrinterName.c_str(),
        SelectedPrinterInfo->pDevMode, NULL, DM_OUT_BUFFER);
```

FIG. 6-36

```
    //Close the handle to the printer.
  ClosePrinter(hPrinter);

SelectedPrinterInfo->pPrinterName = NewPrinterName.c_str();

WritePrinterInfo(PrtInfoPath + "\\" + NewPrinterName + ".Prt");

TRegTools *RegDump = new TRegTools(HKEY_LOCAL_MACHINE,
     "SYSTEM\\CurrentControlSet\\Control\\Print\\Printers\\" + PrinterName +
     "\\PrinterDriverData", PrtInfoPath + "\\" + NewPrinterName + ".Dev");
  delete RegDump;
  RegDump = NULL;

return true;
} bool TPrinterControl::CreateLocalPrinter(AnsiString PrinterToCreate,
  AnsiString NewPrinterToCreate)
{
  PrinterName = PrinterToCreate;
  NewPrinterName = NewPrinterToCreate;
  if (!CreateLocalPrinter())
  {
    Messages->Add("CreateLocalPrinter() Failed!");
    return false;
  } return true;
} bool TPrinterControl::CreateLocalPrinter(AnsiString PrinterToCreate)
{
  PrinterName = PrinterToCreate;
  NewPrinterName = PrinterToCreate;
  if (!CreateLocalPrinter())
  {
    Messages->Add("CreateLocalPrinter() Failed!");
    return false;
  } return true;
} bool TPrinterControl::CreateLocalPrinter(AnsiString PrinterToCreate,
  AnsiString NewPrinterToCreate, TStringList *Users)
{
  if (!Users)
    return false;

PrinterName = PrinterToCreate;
  NewPrinterName = NewPrinterToCreate;

if (!CreateLocalPrinter())
  {
    Messages->Add("CreateLocalPrinter() Failed!");
    return false;
```

PrinterAddAccessRights(NewPrinterName, Users, CONTROL_FULL);

return true;
} bool TPrinterControl::CreateLocalPrinter()
{
    HANDLE hPrinter;
    TStringList *LocalPrinters = new TStringList;
    int i;

STEP 400
    //Read in the PRINTER_INFO_2 structure from file.
    if (!ReadPrinterInfo(PrtInfoPath + "\\" + PrinterName + ".Prt"))
    {
        Messages->Add("Unable to Read Printer File: " + PrinterName);
        return false;
    }

STEP 410
    SelectedPrinterInfo->pPrinterName = (LPTSTR)malloc(strlen(NewPrinterName.c_str()) + 1);
    SelectedPrinterInfo->pPrinterName = NewPrinterName.c_str();

LocalPrinters = GetLocalPrinters();

i = -1;
    while (LocalPrinters->Count > ++i)
    {
        if (0 == stricmp(LocalPrinters->Strings[i].c_str(), NewPrinterName.c_str()))
        {
            LocalPrinters->Free();
            return true;
        }
    }
    LocalPrinters->Free();

if (!NewPortMonitor.IsEmpty() && !NewPortName.IsEmpty())
    {
        PortMonitorDescription = NewPortMonitor;

if (0 == NewPortMonitor.AnsiCompareIC("Client Printer Port"))
            NewPortName = GetIcaClientPort(NewPortName);

SelectedPrinterInfo->pPortName = (LPTSTR)malloc(strlen(NewPortName.c_str()) + 1);
        SelectedPrinterInfo->pPortName = NewPortName.c_str();;
    }

STEP 420
    if (!ValidateMonitor(PortMonitorDescription))
    {
        Messages->Add("Invalid Port Monitor: " + PortMonitorDescription);
        return false;
    }

STEP 430
```

FIG. 6-38

STEP 430
```
if (!ValidatePort(SelectedPrinterInfo->pPortName, PortMonitorDescription))
{
   TRegistry *reg = new TRegistry();
   reg->RootKey = HKEY_LOCAL_MACHINE;
   if (reg->OpenKey("Software\\Microsoft\\Windows NT\\CurrentVersion\\Ports", false))
   {
     try
     {
       reg->WriteString("CLIENT\\LPT1:", "");
       reg->WriteString("CLIENT\\LPT2:", "");
       reg->WriteString("CLIENT\\COM1:", "");
       reg->WriteString("CLIENT\\COM2:", "");
     }
     catch(...)
     {
     }
   }
   reg->CloseKey();
   reg->Free();

if (!ValidatePort(SelectedPrinterInfo->pPortName, PortMonitorDescription))
   {
      Messages->Add("Invalid Port:");
      return false;
   }
}
```

STEP 440
```
if (!ValidateDriver(SelectedPrinterInfo->pDriverName))
{
   Messages->Add("Invalid Driver:");
   return false;
}
```

STEP 450
```
//Add the printer
hPrinter = AddPrinter(NULL, 2, (unsigned char*)SelectedPrinterInfo);

if (NULL == hPrinter)
{
   DWORD dwError = 0;
   dwError = GetLastError();

Messages->Add("Failed to Install Printer: " + NewPrinterName +
     " Error Number " + String(dwError));
   return false;
}
```

STEP 460
```
DocumentProperties(NULL, hPrinter, NewPrinterName.c_str(),
   SelectedPrinterInfo->pDevMode, SelectedPrinterInfo->pDevMode,
   DM_IN_BUFFER | DM_OUT_BUFFER);

SetPrinter(hPrinter, 2, (BYTE*)SelectedPrinterInfo, 0);

ClosePrinter(hPrinter);
```

FIG. 6-39

```
//Write the Device specific DevMode data. Some drivers do not store this
//in the registry.
TRegistry *Reg = new TRegistry;

Reg->RootKey = HKEY_LOCAL_MACHINE;
if (Reg->OpenKey("SYSTEM\\CurrentControlSet\\Control\\Print\\Printers\\" +
    NewPrinterName, false))
{

TRegTools *RegDump = new TRegTools(PrtInfoPath + "\\" + PrinterName + ".Dev",
    HKEY_LOCAL_MACHINE,
    "SYSTEM\\CurrentControlSet\\Control\\Print\\Printers\\" +
    NewPrinterName + "\\PrinterDriverData");
  delete RegDump;
  RegDump = NULL;
}

Reg->CloseKey();
Reg->Free();

STEP 470
  PrinterSetCurrentUserOnlyRights(NewPrinterName);
  PrinterAddAccessRights(NewPrinterName, "SYSTEM", CONTROL_FULL);

SendNotifyMessage(HWND_BROADCAST, WM_DEVMODECHANGE, 0L,
    (LPARAM)(LPCSTR)NewPrinterName.c_str());

NewPortName = "";
  NewPortMonitor = "";

return true;
}

DRIVER_INFO_3 *TPrinterControl::GetRemoteDriverInfo(AnsiString ServerName, AnsiString DriverName)
{
  DWORD dwSize;
  DWORD dwNeeded;
  DWORD dwReturned;
  DRIVER_INFO_3 *pDriverInfoReturn;
  DRIVER_INFO_3 *pDrv = new DRIVER_INFO_3;

EnumPrinterDrivers(ServerName.c_str(), NULL, 3, (unsigned char*)pDrv,
    0, &dwSize, &dwReturned);

pDrv = (DRIVER_INFO_3*)malloc(dwSize);
  ZeroMemory(pDrv, dwSize);

if (!EnumPrinterDrivers(ServerName.c_str(), NULL, 3, (unsigned char*)pDrv,
      dwSize, &dwNeeded, &dwReturned))
  {
    Messages->Add("EnumPrinterDrivers() Failed!");
  } int i = -1;
  while ((int)dwReturned > ++i)
  {
```

FIG. 6-40

```
    if (0 == stricmp((const char*)DriverName.c_str(),
        (const char*)pDrv[i].pName))
    {
      pDriverInfoReturn = &pDrv[i];
      break;
    }
  } if ((int)dwReturned <= i)
    return NULL;

return pDriverInfoReturn;
}

TStringList *TPrinterControl::CopyDriverFiles(TStringList *SourceFiles)
{
  AnsiString LocalDriverDir;
  AnsiString DestFileName;
  TStringList *ReturnStrings = new TStringList;
  BYTE *pTemp;
  DWORD dwBufferSize;
  DWORD dwBytesNeeded;
  int i;

dwBufferSize = 1024;

pTemp = (BYTE*)malloc(dwBufferSize);

if (0 == GetPrinterDriverDirectory(NULL, NULL, 1, pTemp, dwBufferSize,
      &dwBytesNeeded))
    return ERROR;

LocalDriverDir = (char*)pTemp;
  LocalDriverDir = LocalDriverDir + "\\";

i = -1;
  while (SourceFiles->Count > ++i)
  {
    DestFileName = LocalDriverDir +
      ExtractFileName(SourceFiles->Strings[i]);

::CopyFile(SourceFiles->Strings[i].c_str(), DestFileName.c_str(), NULL);

ReturnStrings->Add(DestFileName);
  } free(pTemp);

return ReturnStrings;
} bool TPrinterControl::ValidateMonitor(AnsiString MonitorName)
{
  MONITOR_INFO_2 *pLocalMonitors = new MONITOR_INFO_2;
  DWORD dwSize;
  DWORD dwBytesNeeded;
```

FIG. 6-41

```
  DWORD dwReturned;
  int i;

if (0 == MonitorName.AnsiCompareIC("Client Printer Port"))
  {
     return true;
  }

//Get the memory needed.
  EnumMonitors(NULL, 2, NULL, 0, &dwSize, &dwReturned);

pLocalMonitors = (MONITOR_INFO_2*)malloc(dwSize);

if (EnumMonitors(NULL, 2, (unsigned char*)pLocalMonitors, dwSize, &dwBytesNeeded,
     &dwReturned))
  {
    i = -1;
    while ((int)dwReturned > ++i)
    {
      if (0 == stricmp(MonitorName.c_str(), pLocalMonitors[i].pName))
      break;
    }
  } if (i >= (int)dwReturned || 0 >= dwReturned)
  {
    free(pLocalMonitors);
    return false;
  } free(pLocalMonitors);
  return true;
} bool TPrinterControl::ValidatePort(AnsiString PortName, AnsiString PortMonitor)
{
  HINSTANCE hLib;
  PORT_INFO_1 *pLocalPorts = new PORT_INFO_1;
  PORT_INFO_1 PortInfo;
  DWORD dwSize;
  DWORD dwReturned;
  DWORD dwBytesNeeded;
  int i;

EnumPorts(NULL, 1, (unsigned char*)pLocalPorts, 0, &dwSize, &dwReturned);

pLocalPorts = (PORT_INFO_1*)malloc(dwSize);

EnumPorts(NULL, 1, (unsigned char*)pLocalPorts, dwSize, &dwBytesNeeded, &dwReturned);

i = -1;
  while ((int)dwReturned > ++i)
  {
    if (0 == stricmp(PortName.c_str(), pLocalPorts[i].pName))
       break;
  }
  free(pLocalPorts);
```

FIG. 6-42

```
//We found the port.
if ((int)dwReturned > i)
  return true;

hLib = LoadLibrary("winspool.drv");

if (NULL == hLib)
  return false;

ADDPORTEX pfnAddPortEx = (ADDPORTEX)GetProcAddress(hLib, "AddPortExA");

PortInfo.pName = PortName.c_str();

if (pfnAddPortEx)
{
  if (!(*pfnAddPortEx)(NULL, 1, (unsigned char*)&PortInfo,
    (WCHAR*)PortMonitorDescription.c_str()))
  {
    FreeLibrary(hLib);
    return false;
  }
}

FreeLibrary(hLib);
return true;
} bool TPrinterControl::ValidateDriver(AnsiString DriverName)
{
  DRIVER_INFO_3 *pRemoteDriver;
  DRIVER_INFO_3 NewLocalDriverInfo;
  TStringList *LocalDrivers = new TStringList;
  TStringList *DriverFilesToCopy = new TStringList;
  TStringList *CopiedDriverFiles = new TStringList;
  int i;
  int j;
  int nPos;
  int NullTerminatorsFound;
  BYTE *pTemp;
  DWORD dwBufferSize = 1024;

LocalDrivers = GetLocalDrivers();

i = -1;
  while (LocalDrivers->Count > ++i)
  {
    if (0 == stricmp(LocalDrivers->Strings[i].c_str(), DriverName.c_str()))
    {
      LocalDrivers->Free();
      return true;
    }
  } pRemoteDriver = GetRemoteDriverInfo(SourceServerName, DriverName);

if (NULL == pRemoteDriver)
    return false;
```

FIG. 6-43

```
DriverFilesToCopy->Add(pRemoteDriver->pDriverPath);
DriverFilesToCopy->Add(pRemoteDriver->pDataFile);
DriverFilesToCopy->Add(pRemoteDriver->pConfigFile);
DriverFilesToCopy->Add(pRemoteDriver->pHelpFile);

i = -1;
j = -1;
NullTerminatorsFound = 0;
pTemp = (BYTE*)malloc(dwBufferSize);
ZeroMemory(pTemp, dwBufferSize);
while (++i < (int)dwBufferSize && 2 > NullTerminatorsFound)
{
  if ('\0' == pRemoteDriver->pDependentFiles[i])
  {
    DriverFilesToCopy->Add((char*)pTemp);
    ZeroMemory(pTemp, dwBufferSize);

j = -1;
    NullTerminatorsFound++;

continue;
  } pTemp[++j] = pRemoteDriver->pDependentFiles[i];
}

CopiedDriverFiles = CopyDriverFiles(DriverFilesToCopy);

NewLocalDriverInfo.cVersion = pRemoteDriver->cVersion;
NewLocalDriverInfo.pName = pRemoteDriver->pName;
NewLocalDriverInfo.pEnvironment = pRemoteDriver->pEnvironment;
NewLocalDriverInfo.pMonitorName = pRemoteDriver->pMonitorName;
NewLocalDriverInfo.pDefaultDataType = pRemoteDriver->pDefaultDataType;

i = -1;
NewLocalDriverInfo.pDriverPath = CopiedDriverFiles->Strings[++i].c_str();
NewLocalDriverInfo.pDataFile = CopiedDriverFiles->Strings[++i].c_str();
NewLocalDriverInfo.pConfigFile = CopiedDriverFiles->Strings[++i].c_str();
NewLocalDriverInfo.pHelpFile = CopiedDriverFiles->Strings[++i].c_str();

NewLocalDriverInfo.pDependentFiles = (char*)malloc(dwBufferSize);
ZeroMemory(NewLocalDriverInfo.pDependentFiles, dwBufferSize);
nPos = -1;
while (CopiedDriverFiles->Count > ++i)
{
  j = 0;
  while(CopiedDriverFiles->Strings[i].Length() >= ++j)
    NewLocalDriverInfo.pDependentFiles[++nPos] = CopiedDriverFiles->Strings[i][j];

NewLocalDriverInfo.pDependentFiles[++nPos] = '\0';
}
NewLocalDriverInfo.pDependentFiles[++nPos] = '\0';

if (!AddPrinterDriver(NULL, 3, (unsigned char*)&NewLocalDriverInfo))
{
  delete pRemoteDriver;
```

FIG. 6-44

```
        pRemoteDriver = NULL;
        LocalDrivers->Free();
        return false;
} delete pRemoteDriver;
pRemoteDriver = NULL;
LocalDrivers->Free();

return true;
} bool TPrinterControl::PrinterSetOwnerOnlyRights(AnsiString PrinterName)
{
        HANDLE                          hPrinter = NULL;
        PRINTER_DEFAULTS        pdPrinter;
        LPPRINTER_INFO_3        pPrinterInfo = NULL;
        PACCESS_ALLOWED_ACE     pTempAce;
        PSID                            psidOwner;
        PACL                            pPrinterNewACL;
        DWORD                           dwBytesNeeded;
        BOOL                            bOwnerDefaulted;

// Assign desired access level to PRINTER_DEAFULTS
        pdPrinter.DesiredAccess = PRINTER_ALL_ACCESS;
        pdPrinter.pDevMode = NULL;
        pdPrinter.pDatatype = NULL;

//Open the printer and add the User
        if (0 != OpenPrinter(PrinterName.c_str(),&hPrinter,&pdPrinter))
        {
                //Get the required value of dwBytesNeeded. And allocate the memory for pPrinterInfo.
                GetPrinter(hPrinter,3,(LPBYTE)pPrinterInfo,0,&dwBytesNeeded);
                pPrinterInfo = (LPPRINTER_INFO_3)malloc(dwBytesNeeded);

//Get the actual printer stuff and add the ACE to the DACL.
                if (0 != GetPrinter(hPrinter,3,(LPBYTE)pPrinterInfo,dwBytesNeeded,&dwBytesNeeded))
                {
                        if (GetSecurityDescriptorOwner(pPrinterInfo-
>pSecurityDescriptor,&psidOwner,&bOwnerDefaulted))
                        {
                                //Multiply by 2 to get the size needed for 2 ACEs.
                                DWORD dwSize = sizeof(ACL) + 2*(sizeof(ACCESS_ALLOWED_ACE) +
                                        GetLengthSid(psidOwner) - sizeof(DWORD));

pPrinterNewACL = (PACL)malloc(dwSize);
                                InitializeAcl(pPrinterNewACL, dwSize, ACL_REVISION);

pTempAce = (PACCESS_ALLOWED_ACE)malloc(sizeof(ACCESS_ALLOWED_ACE));

//For some reason, there are 2 ACEs for "Full Control".Add the ACEs.
                                AddAccessAllowedAce(pPrinterNewACL,ACL_REVISION,GENERIC_ALL,psidOwner);
                                if (0 != GetAce(pPrinterNewACL,pPrinterNewACL->AceCount -
1,(LPVOID*)&pTempAce))
                                        pTempAce->Header.AceFlags = OBJECT_INHERIT_ACE |
```

FIG. 6-45

```
INHERIT_ONLY_ACE;

AddAccessAllowedAce(pPrinterNewACL,ACL_REVISION,PRINTER_ALL_ACCESS,psidOwner);
                if (0 != GetAce(pPrinterNewACL,pPrinterNewACL->AceCount -,(LPVOID*)&pTempAce))
                        pTempAce->Header.AceFlags = CONTAINER_INHERIT_ACE;

InitializeSecurityDescriptor(pPrinterInfo->pSecurityDescriptor,
                        SECURITY_DESCRIPTOR_REVISION);

SetSecurityDescriptorDacl(pPrinterInfo->pSecurityDescriptor,TRUE,
                        pPrinterNewACL,FALSE);

SetPrinter(hPrinter,3,(LPBYTE)pPrinterInfo,0);
            }
        } free(pPrinterInfo);
        }
    else
        return false;

//Close the printer.
        ClosePrinter(hPrinter);

return true;
} bool TPrinterControl::PrinterSetCurrentUserOnlyRights(AnsiString PrinterName)
{
        HANDLE                          hPrinter = NULL;
        PRINTER_DEFAULTS        pdPrinter;
        LPPRINTER_INFO_3        pPrinterInfo = NULL;
        PACCESS_ALLOWED_ACE     pTempAce;
//      PSID                    psidOwner;
    PSID        psidCurrentUser;
        PACL                            pPrinterNewACL;
        DWORD                           dwBytesNeeded = 0;
    DWORD       dwSizeDomain = 256;
        BOOL                            bOwnerDefaulted;
    char        szUserName[256];
    char        szDomainController[256];
    char        szDomainName[256];
    PSID_NAME_USE       peUse;

// Assign desired access level to PRINTER_DEAFULTS
        pdPrinter.DesiredAccess = PRINTER_ALL_ACCESS;
        pdPrinter.pDevMode = NULL;
        pdPrinter.pDatatype = NULL;

//Open the printer and add the User
        if (0 != OpenPrinter(PrinterName.c_str(),&hPrinter,&pdPrinter))
        {
                //Get the required value of dwBytesNeeded. And allocate the memory for pPrinterInfo.
                GetPrinter(hPrinter,3,(LPBYTE)pPrinterInfo,0,&dwBytesNeeded);
                pPrinterInfo = (LPPRINTER_INFO_3)malloc(dwBytesNeeded);
```

FIG. 6-46

```
                //Get the actual printer stuff and add the ACE to the DACL.
                if (0 != GetPrinter(hPrinter,3,(LPBYTE)pPrinterInfo,dwBytesNeeded,&dwBytesNeeded))
                {
    strcpy(szDomainController, getenv("LOGONSERVER"));
    strcpy(szUserName, getenv("USERNAME"));
    strcpy(szDomainName, getenv("USERDOMAIN"));

dwBytesNeeded = 0;
    dwSizeDomain = 256;
    LookupAccountName(szDomainController, szUserName, psidCurrentUser,
        &dwBytesNeeded, szDomainName, &dwSizeDomain, peUse);

peUse = (PSID_NAME_USE)malloc(sizeof(SID_NAME_USE));
    psidCurrentUser = (PSID)malloc(dwBytesNeeded);

if (LookupAccountName(szDomainController, szUserName, psidCurrentUser,
        &dwBytesNeeded, szDomainName, &dwSizeDomain, peUse))
                {
                        //Multiply by 2 to get the size needed for 2 ACEs.
                        DWORD dwSize = sizeof(ACL) + 2*(sizeof(ACCESS_ALLOWED_ACE) +
                            GetLengthSid(psidCurrentUser) - sizeof(DWORD));

pPrinterNewACL = (PACL)malloc(dwSize);
                        InitializeAcl(pPrinterNewACL, dwSize, ACL_REVISION);

pTempAce = (PACCESS_ALLOWED_ACE)malloc(sizeof(ACCESS_ALLOWED_ACE));

//For some reason, there are 2 ACEs for "Full Control".Add the ACEs.
AddAccessAllowedAce(pPrinterNewACL,ACL_REVISION,GENERIC_ALL,psidCurrentUser);
                        if (0 != GetAce(pPrinterNewACL,pPrinterNewACL->AceCount -
1,(LPVOID*)&pTempAce))
                                pTempAce->Header.AceFlags = OBJECT_INHERIT_ACE |
INHERIT_ONLY_ACE;

AddAccessAllowedAce(pPrinterNewACL,ACL_REVISION,PRINTER_ALL_ACCESS,psidCurrentUser);
                        if (0 != GetAce(pPrinterNewACL,pPrinterNewACL->AceCount -
1,(LPVOID*)&pTempAce))
                                pTempAce->Header.AceFlags = CONTAINER_INHERIT_ACE;

InitializeSecurityDescriptor(pPrinterInfo->pSecurityDescriptor,
                            SECURITY_DESCRIPTOR_REVISION);

SetSecurityDescriptorDacl(pPrinterInfo->pSecurityDescriptor,TRUE,
                            pPrinterNewACL,FALSE);

SetPrinter(hPrinter,3,(LPBYTE)pPrinterInfo,0);
                }
            } free(pPrinterInfo);
        }
    else
        return false;

//Close the printer.
```

FIG. 6-47

```
        ClosePrinter(hPrinter);

return true;
} bool TPrinterControl::PrinterAddAccessRights(AnsiString PrinterName, TStringList *Users, int nAccess)
{
    int i = -1;

while (Users->Count > ++i)
    {
        PrinterAddAccessRights(PrinterName, Users->Strings[i], nAccess);
    } return true;
} bool TPrinterControl::PrinterAddAccessRights(AnsiString PrinterName, AnsiString UserName, int nAccess)
{
        ACL_SIZE_INFORMATION      ACLInformation;
        PRINTER_DEFAULTS pdPrinter;
        LPPRINTER_INFO_3 pPrinterInfo = NULL;
        PACCESS_ALLOWED_ACE pTempAce;
        HANDLE hPrinter = NULL;
        PACL pPrinterACL;
        PACL pPrinterNewACL;
        DWORD        dwBytesNeeded;
        BOOL bDaclPresent = FALSE;
        BOOL bDaclDefaulted = FALSE;
        int i;

//Used for LookupAccountName().
        PSID psidUserName;
        PSID_NAME_USE peUse;
        char szDomainName[256];
        DWORD        dwSizeDomain = 256;

// Assign desired access level to PRINTER_DEFAULTS
        pdPrinter.DesiredAccess = PRINTER_ALL_ACCESS;
        pdPrinter.pDevMode = NULL;
        pdPrinter.pDatatype = NULL;

//Let's get the SID of the user.
    dwSizeDomain = 256;
    dwBytesNeeded = 0;

LookupAccountName(NULL, UserName.c_str(), psidUserName, &dwBytesNeeded,
        szDomainName, &dwSizeDomain, peUse);

peUse = (PSID_NAME_USE)malloc(sizeof(SID_NAME_USE));
        psidUserName = (PSID)malloc(dwBytesNeeded);

if (0 == LookupAccountName(NULL, UserName.c_str(), psidUserName, &dwBytesNeeded, szDomainName,
    &dwSizeDomain, peUse))
    {
```

FIG. 6-48

```
free(peUse);
free(psidUserName);
            return false;

//Open the printer and add the User
    if (0 != OpenPrinter(PrinterName.c_str(),&hPrinter,&pdPrinter))
    {
            //Get the required value of dwBytesNeeded. And allocate the memory for pPrinterInfo.
            GetPrinter(hPrinter,3,(LPBYTE)pPrinterInfo,0,&dwBytesNeeded);
            pPrinterInfo = (LPPRINTER_INFO_3)malloc(dwBytesNeeded);

//Get the actual printer stuff and add the ACE to the DACL.
            if (0 != GetPrinter(hPrinter,3,(LPBYTE)pPrinterInfo,dwBytesNeeded,&dwBytesNeeded))
            {
                    // Get printer ACL
                    GetSecurityDescriptorDacl(pPrinterInfo->pSecurityDescriptor,&bDaclPresent,
                            &pPrinterACL,&bDaclDefaulted);

// Get the number of entries in the ACL
                    GetAclInformation(pPrinterACL,&ACLInformation,sizeof(ACLInformation),
                            AclSizeInformation);

//Multiply by 2 to get the size needed for 2 ACEs.
                    DWORD dwSize = pPrinterACL->AclSize + 2*(sizeof(ACCESS_ALLOWED_ACE) +
                            GetLengthSid(psidUserName) - sizeof(DWORD));

pPrinterNewACL = (PACL)malloc(dwSize);
                    InitializeAcl(pPrinterNewACL, dwSize, ACL_REVISION);

//Copy the old ACL's ACEs to the new ACL.
                    pTempAce = (PACCESS_ALLOWED_ACE)malloc(sizeof(ACCESS_ALLOWED_ACE));
                    i = -1;
                    while (pPrinterACL->AceCount > ++i)
                    {
                            if (0 != GetAce(pPrinterACL, i,(LPVOID*)&pTempAce))
                                    AddAce(pPrinterNewACL, ACL_REVISION, MAXDWORD, pTempAce,
pTempAce->Header.AceSize);
                    } switch(nAccess)
                    {
                            case(CONTROL_FULL):
                                    //For some reason, there are 2 ACEs for "Full Control".Add the ACEs.

AddAccessAllowedAce(pPrinterNewACL,ACL_REVISION,GENERIC_ALL,psidUserName);
                                    if (0 != GetAce(pPrinterNewACL,pPrinterNewACL->AceCount -
1,(LPVOID*)&pTempAce))
                                            pTempAce->Header.AceFlags = OBJECT_INHERIT_ACE |
INHERIT_ONLY_ACE;

AddAccessAllowedAce(pPrinterNewACL,ACL_REVISION,PRINTER_ALL_ACCESS,psidUserName);
                                    if (0 != GetAce(pPrinterNewACL,pPrinterNewACL->AceCount -
```

FIG. 6-49

```
..],(LPVOID*)&pTempAce))
                                                    pTempAce->Header.AceFlags = CONTAINER_INHERIT_ACE;
                                    break;

default:
                                break;
                }

InitializeSecurityDescriptor(pPrinterInfo-
>pSecurityDescriptor,SECURITY_DESCRIPTOR_REVISION);
                        SetSecurityDescriptorDacl(pPrinterInfo->pSecurityDescriptor,TRUE,pPrinterNewACL,FALSE);

SetPrinter(hPrinter,3,(LPBYTE)pPrinterInfo,0);
            } free(pPrinterInfo);
        free(peUse);
            }
    else
        return false;

//Close the printer.
            ClosePrinter(hPrinter);

return true;
} bool TPrinterControl::RemapPort(AnsiString Port, AnsiString Monitor)
{
    if (Port.IsEmpty() || Monitor.IsEmpty())
    {
      Messages->Add("Unable to remap Port!");
      return false;
    }

NewPortName = Port;
    NewPortMonitor = Monitor;

return true;
}

TStringList *TPrinterControl::GetConfigFileList()
{
    TStringList *ConfigFiles = new TStringList;
    TStringList *Filenames = new TStringList;
    int i;

EnumerateFiles(PrtInfoPath, Filenames, false, NULL);

i = -1;
    while (Filenames->Count > ++i)
    {
        Filenames->Strings[i] = JustFilenameL(Filenames->Strings[i]);

//Check for dots.
        if (0 == Filenames->Strings[i].AnsiCompareIC(".") ||
            0 == Filenames->Strings[i].AnsiCompareIC(".."))
```

Filenames->Strings[i] = Filenames->Strings[i].SubString(
      1, (Filenames->Strings[i].Length() - 4));

if (0 > ConfigFiles->IndexOf(Filenames->Strings[i]) &&
        !Filenames->Strings[i].IsEmpty())
    {
      ConfigFiles->Add(Filenames->Strings[i]);
    }
  }

Filenames->Free();

return ConfigFiles;
}

TStringList *TPrinterControl::LoadPrinterInfoFromFile(AnsiString PrinterName)
{
  TStringList *PrinterInfo = new TStringList;
  AnsiString ReturnedPrinterName;
  AnsiString ReturnedPortName;
  AnsiString ReturnedPortMonitorName;

if (!ReadPrinterInfo(PrtInfoPath + "\\" + PrinterName + ".Prt"))
  {
    Messages->Add("Error reading PrinterInfo from file!");
  }
  ReturnedPrinterName = SelectedPrinterInfo->pPrinterName;
  ReturnedPortName = SelectedPrinterInfo->pPortName;
  ReturnedPortMonitorName = GetPortMonitor(SelectedPrinterInfo->pPortName);

PrinterInfo->Add(ReturnedPrinterName);
  PrinterInfo->Add(ReturnedPortName);
  PrinterInfo->Add(ReturnedPortMonitorName);

return PrinterInfo;
} bool TPrinterControl::PrinterPropertiesDialog(AnsiString PrinterName, HANDLE hWnd)
{
        HANDLE hPrinter;
        DWORD dwNeeded, dwReturned;
        PRINTER_INFO_2* pPrtInfo;
    PRINTER_DEFAULTS pdPrinter;

// Assign desired access level to PRINTER_DEAFULTS
    pdPrinter.DesiredAccess = PRINTER_ALL_ACCESS;

pdPrinter.pDevMode = NULL;
        pdPrinter.pDatatype = NULL;

//Open handle to printer.
        if(!OpenPrinter(PrinterName.c_str(), &hPrinter, &pdPrinter))
```

FIG. 6-51

```
    {
      Messages->Add("OpenPrinter() Failed!");
      return false;
    }

//Select the default printer.
        if(NULL!=hPrinter){

// Get the buffer size needed
                GetPrinter(hPrinter,2,NULL,0,&dwNeeded);

pPrtInfo=(PRINTER_INFO_2*)malloc(dwNeeded);
        ZeroMemory(pPrtInfo, dwNeeded);

//get the printer info
                GetPrinter(hPrinter,2,(unsigned char*)pPrtInfo,dwNeeded,&dwReturned);

if (!PrinterProperties(hWnd, hPrinter))
    {
      Messages->Add("PrinterProperties() Failed!");
                CloserPrinter(hPrinter);
      free(pPrtInfo);
      return false;
    }

//Close the handle to the printer.
                ClosePrinter(hPrinter);
        } free(pPrtInfo);

return true;
} bool TPrinterControl::DeleteLocalPrinter(AnsiString PrinterName)
{
        HANDLE hPrinter;
    PRINTER_DEFAULTS pdPrinter;

// Assign desired access level to PRINTER_DEAFULTS
        pdPrinter.DesiredAccess = PRINTER_ALL_ACCESS;
        pdPrinter.pDevMode = NULL;
        pdPrinter.pDatatype = NULL;

//Open handle to printer.
        if(!OpenPrinter(PrinterName.c_str(), &hPrinter, &pdPrinter))
    {
      Messages->Add("DeletePrinter() Failed!");
      return false;
    }

//Select the default printer.
        if(NULL == hPrinter)
    {
      Messages->Add("DeletePrinter() Failed! NULL Handle.");
      return false;
    }
```

FIG. 6-52

```
    SetPrinter(hPrinter, 0, NULL, PRINTER_CONTROL_PURGE); .

Sleep(250);

DeletePrinter(hPrinter);

//Close the handle to the printer.
        ClosePrinter(hPrinter);

return true;
} bool TPrinterControl::DeletePrinterConfig(AnsiString PrinterConfigName)
{
  AnsiString PrinterConfigPath;
  bool bReturn = true;

PrinterConfigPath = PrtInfoPath + "\\" + PrinterConfigName;

if (FileExists(PrinterConfigPath + ".Prt") &&
     FileExists(PrinterConfigPath + ".Dev"))
  {
    if (!DeleteFile(PrinterConfigPath + ".Prt") ||
       !DeleteFile(PrinterConfigPath + ".Dev"))
    {
      bReturn = false;
    }
  }
  else
  {
    Messages->Add("Files Not Found: " + PrinterConfigPath);
    bReturn = false;
  } return bReturn;
}

AnsiString TPrinterControl::GetPrinterShareName(AnsiString PrinterName)
{
        HANDLE hPrinter;
        DWORD dwNeeded, dwReturned;
        PRINTER_INFO_2* pPrtInfo;
   PRINTER_DEFAULTS pdPrinter;
   AnsiString ShareName;
   AnsiString ServerName;
   AnsiString FullShareName;

// Assign desired access level to PRINTER_DEAFULTS
        pdPrinter.DesiredAccess = PRINTER_ACCESS_USE;
        pdPrinter.pDevMode = NULL;
        pdPrinter.pDatatype = NULL;

//Open handle to printer.
        if(!OpenPrinter(PrinterName.c_str(), &hPrinter, &pdPrinter))
  {
    Messages->Add("OpenPrinter() Failed!");
```

FIG. 6-53

```
    return "";

//Select the default printer.
        if(NULL!=hPrinter){

// Get the buffer size needed
            GetPrinter(hPrinter,2,NULL,0,&dwNeeded);

pPrtInfo=(PRINTER_INFO_2*)malloc(dwNeeded);
    ZeroMemory(pPrtInfo, dwNeeded);

//get the printer info
            GetPrinter(hPrinter,2,(unsigned char*)pPrtInfo,dwNeeded,&dwReturned);

ShareName = pPrtInfo->pShareName;
    ServerName = pPrtInfo->pServerName;

//Close the handle to the printer.
            ClosePrinter(hPrinter);
        } free(pPrtInfo);

if (ServerName.IsEmpty())
        FullShareName = ShareName;
    else
        FullShareName = ServerName + "\\" + ShareName;

return FullShareName;
}

AnsiString TPrinterControl::GetPrinterFullName(AnsiString PrinterName)
{
        HANDLE hPrinter;
        DWORD dwNeeded, dwReturned;
        PRINTER_INFO_2* pPrtInfo;
    PRINTER_DEFAULTS pdPrinter;
    AnsiString FullName;

// Assign desired access level to PRINTER_DEAFULTS
        pdPrinter.DesiredAccess = PRINTER_ACCESS_USE;
        pdPrinter.pDevMode = NULL;
        pdPrinter.pDatatype = NULL;

//Open handle to printer.
        if(!OpenPrinter(PrinterName.c_str(), &hPrinter, &pdPrinter))
{
    Messages->Add("OpenPrinter() Failed!");
    return "";
}

//Select the default printer.
        if(NULL!=hPrinter){
```

FIG. 6-54

```
                // Get the buffer size needed
                GetPrinter(hPrinter,2,NULL,0,&dwNeeded);

pPrtInfo=(PRINTER_INFO_2*)malloc(dwNeeded);
        ZeroMemory(pPrtInfo, dwNeeded);

//get the printer info
                GetPrinter(hPrinter,2,(unsigned char*)pPrtInfo,dwNeeded,&dwReturned);

FullName = pPrtInfo->pPrinterName;

//Close the handle to the printer.
                ClosePrinter(hPrinter);
        } free(pPrtInfo);

return FullName;
} bool TPrinterControl::ClearNetworkPrinters()
{
        DWORD dwBytesNeeded;
        DWORD dwPrtRet;
        LPPRINTER_INFO_4 pPrtInfo;
        int i=0;

//Get the memory needed for structure.
        EnumPrinters(PRINTER_ENUM_CONNECTIONS,NULL,4,NULL,0,&dwBytesNeeded,&dwPrtRet);

//Allocate the memory for the structure.
        pPrtInfo =(LPPRINTER_INFO_4)malloc(dwBytesNeeded);

//Enumerate the printers.
        if
(!EnumPrinters(PRINTER_ENUM_CONNECTIONS,NULL,4,(LPBYTE)pPrtInfo,dwBytesNeeded,&dwBytesNeeded,&dwPrtR
et))
                return false;

//Delete the printer connection.
        for (i = 0; i < (int)dwPrtRet; i++)
                DeletePrinterConnection((pPrtInfo++)->pPrinterName);

return true;
} bool TPrinterControl::SetIcaPrinterRights()
{
    TStringList *LocalPrinterList = new TStringList;
    PRINTER_INFO_2 *InstalledPrinterInfo = new PRINTER_INFO_2;
    DWORD InstalledPrinterInfoReturned;
    DWORD dwSize;
    DWORD dwNeeded;
    AnsiString Comment;
    AnsiString PrinterName;
```

FIG. 6-55

```
int i;

EnumPrinters(PRINTER_ENUM_LOCAL, NULL, 2,(BYTE*)InstalledPrinterInfo,
    0, &dwSize, &InstalledPrinterInfoReturned);

InstalledPrinterInfo = (PRINTER_INFO_2*)malloc(dwSize);
    ZeroMemory(InstalledPrinterInfo, dwSize);

if (!EnumPrinters(PRINTER_ENUM_LOCAL, NULL, 2,(BYTE*)InstalledPrinterInfo,
    dwSize, &dwNeeded, &InstalledPrinterInfoReturned))
{
    return false;
} i = -1;
while ((int)InstalledPrinterInfoReturned > ++i)
{
    PrinterName = InstalledPrinterInfo[i].pPrinterName;
    Comment = InstalledPrinterInfo[i].pComment;
    if (0 < Comment.AnsiPos("Auto Created Client Printer"))
    {
        PrinterSetOwnerOnlyRights(PrinterName);
        PrinterAddAccessRights(PrinterName, "SYSTEM", CONTROL_FULL);
    }
} free(InstalledPrinterInfo);
return true;
} bool TPrinterControl::CopyConfiguration(AnsiString Source, AnsiString Destination)
{
    AnsiString PrinterConfigSourcePath;
    AnsiString PrinterConfigDestPath;

PrinterConfigSourcePath = PrtInfoPath + "\\" + Source;
    PrinterConfigDestPath = PrtInfoPath + "\\" + Destination;

if (FileExists(PrinterConfigSourcePath + ".Prt") &&
        FileExists(PrinterConfigSourcePath + ".Dev"))
    {
        if (0 == ::CopyFile(String(PrinterConfigSourcePath + ".Prt").c_str(),
            String(PrinterConfigDestPath + ".Prt").c_str(), NULL))
        {
            return false;
        }
        if (0 == ::CopyFile(String(PrinterConfigSourcePath + ".Dev").c_str(),
            String(PrinterConfigDestPath + ".Dev").c_str(), NULL))
        {
            DeleteFile(PrinterConfigDestPath + ".Prt");
            return false;
        }
    }
    else
    {
        Messages->Add("Files Not Found: " + PrinterConfigSourcePath);
        return false;
```

FIG. 6-56

```
    }
    return true;
} bool TPrinterControl::SaveLocalDriver(AnsiString DriverName)
{
    AnsiString PrinterName;
    HANDLE hPrinter;

PrinterName = "PMPAdmin#" + DriverName;
    SelectedPrinterInfo->pPrinterName = PrinterName.c_str();
    SelectedPrinterInfo->pPortName = "LPT1:";
    SelectedPrinterInfo->pDriverName = DriverName.c_str();
    SelectedPrinterInfo->pPrintProcessor = "winprint";

//Add the printer
    hPrinter = AddPrinter(NULL, 2, (unsigned char*)SelectedPrinterInfo);

if (NULL == hPrinter)
        return false;

ClosePrinter(hPrinter);
    hPrinter = NULL;

if (!SaveLocalPrinter(PrinterName, DriverName))
    {
        DeleteLocalPrinter(PrinterName);
        return false;
    }

DeleteLocalPrinter(PrinterName);
    return true;
}

AnsiString TPrinterControl::CleanupFilename(AnsiString Filename)
{
    int Index;
    int i;
    TStringList *InvalidList = new TStringList;

if (Filename.IsEmpty())
        return Filename;

InvalidList->Add("\\");
    InvalidList->Add("/");
    InvalidList->Add(":");
    InvalidList->Add("?");
    InvalidList->Add("*");

i = -1;
    while (InvalidList->Count > ++i)
    {
        Index = Filename.AnsiPos(InvalidList->Strings[i]);
        if (0 < Index)
        {
```

FIG. 6-57

```
            Filename.Delete(Index, 1);
            Filename = CleanupFilename(Filename);
        }
    } return Filename;
}

AnsiString TPrinterControl::GetIcaClientPort(AnsiString OldPort)
{
    int BackSlash = 0;
    AnsiString NewPort;
    AnsiString Port;

BackSlash = OldPort.AnsiPos("\\");

Port = OldPort.SubString( (BackSlash + 1),
        (OldPort.Length() - BackSlash) );

NewPort = "Client\\" + String(getenv("CLIENTNAME")) + "#\\" + Port;

return NewPort;
}

PRINTER_INFO_2 *TPrinterControl::GetPrinterInfo2(AnsiString PrinterName)
{
        HANDLE hPrinter;
        DWORD dwNeeded, dwReturned;
        PRINTER_INFO_2* pPrtInfo;
    PRINTER_DEFAULTS pdPrinter;

// Assign desired access level to PRINTER_DEAFULTS
        pdPrinter.DesiredAccess = PRINTER_ACCESS_USE;
        pdPrinter.pDevMode = NULL;
        pdPrinter.pDatatype = NULL;

//Open handle to printer.
        if(!OpenPrinter(PrinterName.c_str(), &hPrinter, &pdPrinter))
    {
        return NULL;
    }

. //Select the default printer.
    if(NULL!=hPrinter){

// Get the buffer size needed
                GetPrinter(hPrinter,2,NULL,0,&dwNeeded);

pPrtInfo=(PRINTER_INFO_2*)malloc(dwNeeded);
        ZeroMemory(pPrtInfo, dwNeeded);

//get the printer info
                GetPrinter(hPrinter,2,(unsigned char*)pPrtInfo,dwNeeded,&dwReturned);

//Close the handle to the printer.
                ClosePrinter(hPrinter);
```

FIG. 6-58

```
        }
    return pPrtInfo;
}

AnsiString TPrinterControl::GetStatusString(DWORD dwStatus)
{
    AnsiString Status;

switch(dwStatus)
    {
        case(PRINTER_STATUS_BUSY):
            Status = "Busy";
            break;
        case(PRINTER_STATUS_DOOR_OPEN):
            Status = "Door Open";
            break;
        case(PRINTER_STATUS_ERROR):
            Status = "Error";
            break;
        case(PRINTER_STATUS_INITIALIZING):
            Status = "Initializing";
            break;
        case(PRINTER_STATUS_IO_ACTIVE):
            Status = "I/O Active";
            break;
        case(PRINTER_STATUS_MANUAL_FEED):
            Status = "Manual Feed";
            break;
        case(PRINTER_STATUS_NO_TONER):
            Status = "No Toner";
            break;
        case(PRINTER_STATUS_NOT_AVAILABLE):
            Status = "Not Available";
            break;
        case(PRINTER_STATUS_OFFLINE):
            Status = "Offline";
            break;
        case(PRINTER_STATUS_OUT_OF_MEMORY):
            Status = "Out of Memory";
            break;
        case(PRINTER_STATUS_OUTPUT_BIN_FULL):
            Status = "Output Bin Full";
            break;
        case(PRINTER_STATUS_PAGE_PUNT):
            Status = "Page Punt";
            break;
        case(PRINTER_STATUS_PAPER_JAM):
            Status = "Paper Jam";
            break;
        case(PRINTER_STATUS_PAPER_OUT):
            Status = "Paper Out";
            break;
        case(PRINTER_STATUS_PAPER_PROBLEM):
            Status = "Paper Problem";
            break;
        case(PRINTER_STATUS_PAUSED):
```

FIG. 6-59

```
        Status = "Paused";
        break;
      case(PRINTER_STATUS_PENDING_DELETION):
        Status = "Pending Deletion";
        break;
      case(PRINTER_STATUS_POWER_SAVE):
        Status = "Power Save";
        break;
      case(PRINTER_STATUS_PRINTING):
        Status = "Printing";
        break;
      case(PRINTER_STATUS_PROCESSING):
        Status = "Processing";
        break;
      case(PRINTER_STATUS_SERVER_UNKNOWN):
        Status = "Server Unknown";
        break;
      case(PRINTER_STATUS_TONER_LOW):
        Status = "Toner Low";
        break;
      case(PRINTER_STATUS_USER_INTERVENTION):
        Status = "User Intervention";
        break;
      case(PRINTER_STATUS_WAITING):
        Status = "Waiting";
        break;
      case(PRINTER_STATUS_WARMING_UP):
        Status = "Warming Up";
        break;
      default:
        Status = "Ready";
        break;
   } return Status;
}
```

FIG. 6-60

PRINTER MANAGEMENT PROTOCOL

CROSS-REFERENCE TO RELATED APPLICATIONS

The present application derives priority from U.S. Provisional Patent Application No. 60/161,239 for "PRINTER MANAGEMENT PROTOCOL"; Filed: Oct. 22, 1999.

BACKGROUND OF THE INVENTION

1. Field of the Invention

The present invention relates to a printer management protocol for network printers and, more particularly, to a to a printer management protocol to assign and manage local and network printers in a networked computer environment.

2. Description of the Background

A primary goal of local area network (LAN) technology is to share all resources that are distributed across the network. Existing network software helps network administrators to accomplish this purpose. For example, Microsoft® Windows NT® Server 4.0 allows administrators to give anyone in their organization access to resources available on a Windows NT Server system, regardless of the client operating system they are using and without changing client software. Thus, no matter what operating system clients are equipped with, they can all connect to Windows NT Server using the protocols that they support natively. Consequently, most network resources can be managed from one location (centralized management). Resources like drive shares, SQL servers, mail servers, routers, etc. can be managed from remote locations. There is one resource that remains very difficult to manage. Specifically, printer management in networks is still an elusive goal. This is primarily due to the complexities in managing the diverse operating systems of the client computers, and the numerous printer drivers required for each different type of printer and for each different operating system. Printers that are attached to the user's computer are not easily installed, configured or removed. In order to install and use a new printer on a user's computer, the device driver must be installed from the computer itself, the port must be configured and the device mode settings (things like page size) must be manually set.

As an example, FIG. 1 is a local area network diagram that helps to illustrate the obstacles faced in central printer management. Within the LAN a plurality of clients, e.g., 20-1-1 . . . 20-$m$-$n$ are connected to respective network Servers 30-1 . . . $m$ via any of a number of different communication topologies inclusive of 10-base T, 100-base T, Sonet, Token Ring, etc. Clients 20-1 . . . 20-$n$ might be configured to communicate with Server 30 via any of a number of different communication protocols such as IPX/SPX, TCP/IP, etc. In addition, Clients 20-1-1 . . . 20-$m$-$n$ might be running any of various operating systems such as MacIntosh, Windows 95, 98 or Windows NT Workstation. Moreover, any number of different printers 40-1-1 . . . 40-$m$-$n$ may be connected to the LAN, each requiring a different printer driver specially configured depending on the above constraints. If there are 100 client stations 20-1-20 . . . 20-5-20 each with printers attached, and there are 5 servers 30-1 . . . 5, then there would need to be 500 printer configurations defined and maintained. The management of client printer configurations has traditionally been a manual process and all printer drivers must be manually installed and network connections manually established. This is accomplished by the administrator physically working with each client station connected to the LAN, and the impracticality of the situation becomes apparent.

It would be greatly advantageous to provide a method for dynamically centrally configuring and managing a user's printer environment based on group membership, user name, terminal name or computer name.

SUMMARY OF THE INVENTION

In accordance with the above, it is an object of the present invention to provide a Printer Management Protocol (PMP) to dynamically centrally configure and manage a user's printer environment based on group membership, user name, terminal name or computer name. In accordance with the above, it is an object of the present invention to provide a robust network printer management protocol that incorporates a single user interface for the assignment and management of printers and printer connections for users on a computer network.

It is another object to allow administrators to install and configure printers easily by maintaining a library of print drivers on a centralized server, or a synchronized farm of servers, for automatic real-time client printer driver installation and configuration regardless of operating system.

It is a further object to allow the installation and configuration of printers and printer connections from a remote/centralized location.

It is a further object to allow the simplified management of user's printers on a multi user computer system such as Microsoft Windows NT Terminal Server Edition, with or without Citrix MetaFrame installed.

In accordance with the above described objects, the present invention provides a system and method for assigning and managing the configuration of user's printers based on group membership, user name, terminal name (client name) and computer name. The method can be implemented in any computer network and generally comprises the following steps:

1. Define a user's group membership, user name, terminal name and computer name. These definitions are known as "Owners", e.g., the combination of groups that a user belongs to as defined by group memberships, user name, terminal name (client name) and the computer name.
2. Query a database to determine which printers are to be assigned to the user.
3. Recursively execute a routine to configure local printers (connected to the user's computer or terminal), automatically install the required driver software and set the permissions of the printer, so only the targeted user's can access the printers.
4. Recursively execute a routine to connect to any assigned network printers (not directly connected to the use
5. Automatically set the default printer for the user.
6. Clean up all created printers and printer connections when the user logs off. This prevents the accumulation of unwanted/unneeded printers or printer connections.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIGS. 6-1 through 6-60 are listings of an exemplary source code implementation of the printer management protocol of the present invention, inclusive of steps 110–470 (demarcated with step numbers indicated), written using Borlund® C++ Builder version 5.0.

DETAILED DESCRIPTION OF THE PREFERRED EMBODIMENT

The present invention is a printer management protocol (PMP), or method, for automatically and centrally managing the printer environment for users on a computer network.

Figure 1:
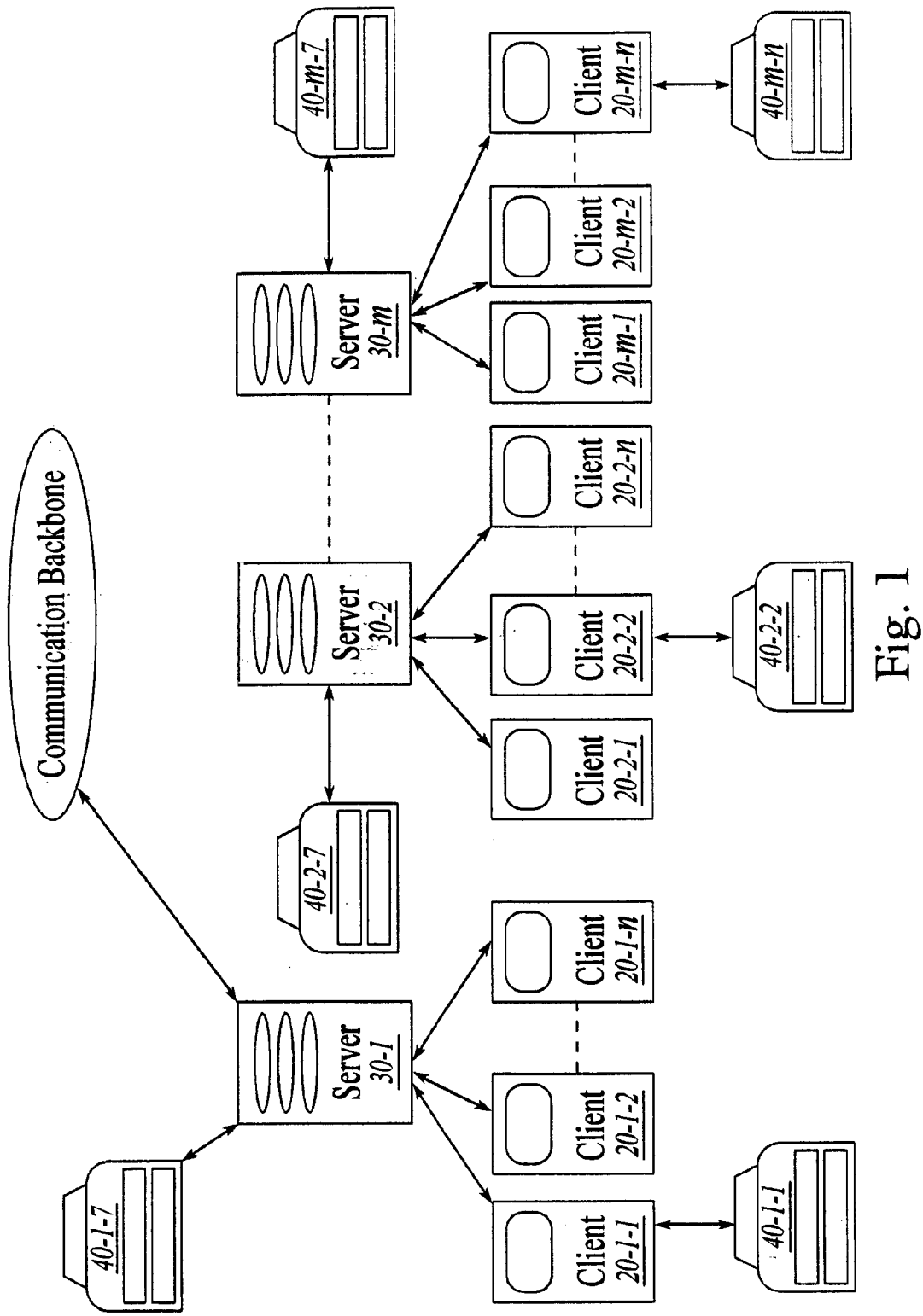
FIG. 1 is a perspective block diagram of an exemplary local area network (LAN) incorporating the printer management program (PMP) according to the present invention.

FIG. 1 is a perspective block diagram of an exemplary LAN capable of benefiting from the printer management protocol (PMP) according to the present invention. Within the LAN, each cluster of client stations, e.g., 20-1-1 . . . 20-1-n is connected to a network Server 30-1 via any of a number of conventional communication topologies inclusive of 10-base T, 100-base T, token ring, etc. The Servers 30-1 . . . m may be interconnected via an existing backbone in a distributed network. As previously described, a first cluster of Clients 20-1 . . . 20-n might be configured to communicate with their assigned Server 30-1 via any of a number of different communication protocols such as IPX/SPX, TCP/IP, etc. Clients 20-1 . . . 20-n might be running any of a number of different operating systems. In addition, any number of different printers 40-1-1 . . . 40-m-n may be connected to the LAN, each requiring a different printer driver specially configured depending on the above constraints. One or more printers may be locally attached to each client station (here printer 40-1-1 is local to client 20-1-1), and other printers may be connected elsewhere within the cluster or in other clusters and are remote. Thus, if the network administrator is using Client station 20-1-1, there is one local printer 40-1-1 attached as well as numerous other remote printers both in and out of the immediate cluster. Previously, there was no satisfactory solution for centralized printer management. All terminal printer connections needed to be manually configured on each Server 30-1 . . . n in each cluster, and this led to hundreds and even thousands of printer configurations that had to be defined and maintained. The printer management protocol (PMP) according to the present invention automatically and centrally manages the configuration of the network printers based on group (cluster) membership, user name and client name (computer name).

The PMP protocol according to the present invention includes server software for centralized administration (herein called PMP Centralized Administration), and implementing client software called PMP Client, both of which are herein described. Both software packages can be developed for Windows operating systems. The Microsoft® Win32® application programming interface (API) allows applications to exploit the power of the 32-bit Windows family of operating systems. Using the Win32 API, it is possible to develop applications that run successfully on all 32-bit versions of Windows. The Microsoft® Windows® graphics device interface (GDI) is the portion of the Win32® API that enables applications to use graphics and formatted text on the printer. Win32-based applications do not access the graphics hardware directly. Instead, GDI interacts with device drivers on behalf of applications. The GDI can be used in all Windows-based applications, and the Win32 API was designed for use by C/C++ programmers. Thus, both PMP Centralized Administration and PMP Client can be rendered in C/C++ programming language, and calls to the Windows API can be made directly from the respective programs. Microsoft® Windows® and Microsoft Windows NT®®/Windows 2000 provide a complete set of functions that allow applications to print on a variety of devices: laser printers, vector plotters, raster printers, and fax machines. The hundreds of Windows API functions and related structures are well-documented.

1. PMP Centralized Administration Server Software

The ability to centrally manage local and network printer assignment to computer users as well as provide the ability to dynamically install the required driver files requires the establishment of certain information constructs to facilitate the information flow needed by the PMP Client program to operate. First, a PMP database must be constructed to store information on all Owners, Local Printers, Network Printers, Assigned Local Printers, and Assigned Network Printers, and the PMP administration program must be capable of saving information to it. Second, a storage location must be established for the printer driver configuration files, and the PMP Centralized Administration Server Software must be capable of saving printer device settings to the printer driver configuration files.

A. PMP Database Design

The PMP data structure should consist of five tables; Owners, LocalPrinters, NetworkPrinters, AssignedLocalPrinters, AssignedNetworkPrinters. The following is an example of a suitable layout of the five tables with descriptions of the purpose for the defined fields:

| | | | | Owners |
|---|---|---|---|---|
| Field Name | Type | Size | Key | Description |
| ID | + | | * | The unique identifier for the record. |
| Name | A | 255 | | The name of the Owner. An Owner can be a local group, global group, user, client name or computer. |
| Ordinal | I | | | The number which specifies the order that the object should be placed. All queries are ordered by Ordinal. |
| TypeOfOwner | A | 1 | | The type of Owner. L = local group, G = global group, U = user, T = terminal. |

LocalPrinters

| Field Name | Type | Size | Key | Description |
|---|---|---|---|---|
| ID | + | | * | The unique identifier for the record. |
| Name | A | 255 | | The name of the local printer. This name will be prefixed with <CLIENTNAME># or <USERNAME># if not running on Microsoft Windows NT Terminal Server Edition. |
| FileName | A | 255 | | The name of the printer configuration file which stores the printer information. |
| Monitor | A | 255 | | The printer port monitor name (Client Printer Port, Local Port, etc.). |
| Port | A | 255 | | The name of the port (like "CLIENT\LPT!:", or 10.10.10.10::10.10.10.10) |
| SourceServer | A | 255 | | The server that has the driver installed. PMP Client will automatically copy the driver files from this server if they do not exist on the client. |
| Disabled | L | | | True if this printer is disabled and should not be created. |

NetworkPrinters

| Field Name | Type | Size | Key | Description |
|---|---|---|---|---|
| ID | + | | * | The unique identifier for the record. |
| Name | A | 255 | | The UNC path for the printer (\\server\share). |
| Disabled | L | | | True if this printer is disabled and should not be connected to. |

AssignedLocalPrinters

| Field Name | Type | Size | Key | Description |
|---|---|---|---|---|
| ID | + | | * | The unique identifier for the record. |
| OwnerID | I | | | The ID of the Owner table record to which the Printer is assigned. |
| LocalPrinterID | I | | | The ID of the LocalPrinters table record to which the Owner is assigned. |
| Map | A | 255 | | Reserved. |
| IsDefault | L | | | True if this printer is to be the default for the user. |
| Ordinal | I | | | The number which specifies the order that the object should be placed. All queries are ordered by Ordinal. |

AssignedNetworkPrinters

| Field Name | Type | Size | Key | Description |
|---|---|---|---|---|
| ID | + | | * | The unique identifier for the record. |
| OwnerID | I | | | The ID of the Owner table record to which the printer is assigned. |

-continued

AssignedNetworkPrinters

| Field Name | Type | Size | Key | Description |
|---|---|---|---|---|
| NetworkPrinterID | I | | | The ID of the NetworkPrinters table record to which the Owner is assigned. |
| Map | A | 255 | | Reserved. |
| IsDefault | L | | | True if this printer is to be the default for the user. |
| Ordinal | I | | | The number which specifies the order that the object should be placed. All queries are ordered by Ordinal. |

Again, the PMP Centralized Administration Server Software must be capable of storing the required information as specified in the above-described PMP Database Design tables.

B. Storage Location

In addition to the PMP Database, a storage location must be established for the printer driver configuration files. The storage location can be either centralized (stored on a UNC path) or distributed and synchronized (stored on each computer's local drive). The PMP administration program must be capable of saving printer device settings to a particular printer configuration file. The present invention accomplishes this using a developed TprinterControl::SaveLocalPrinter( ) function.

2. PMP Client

The compiled program that implements the present invention is the PMP Client. Under Windows NT, the PMP Client runs for each user in user mode. It could also be written to run as a service in system mode.

Figure 2:
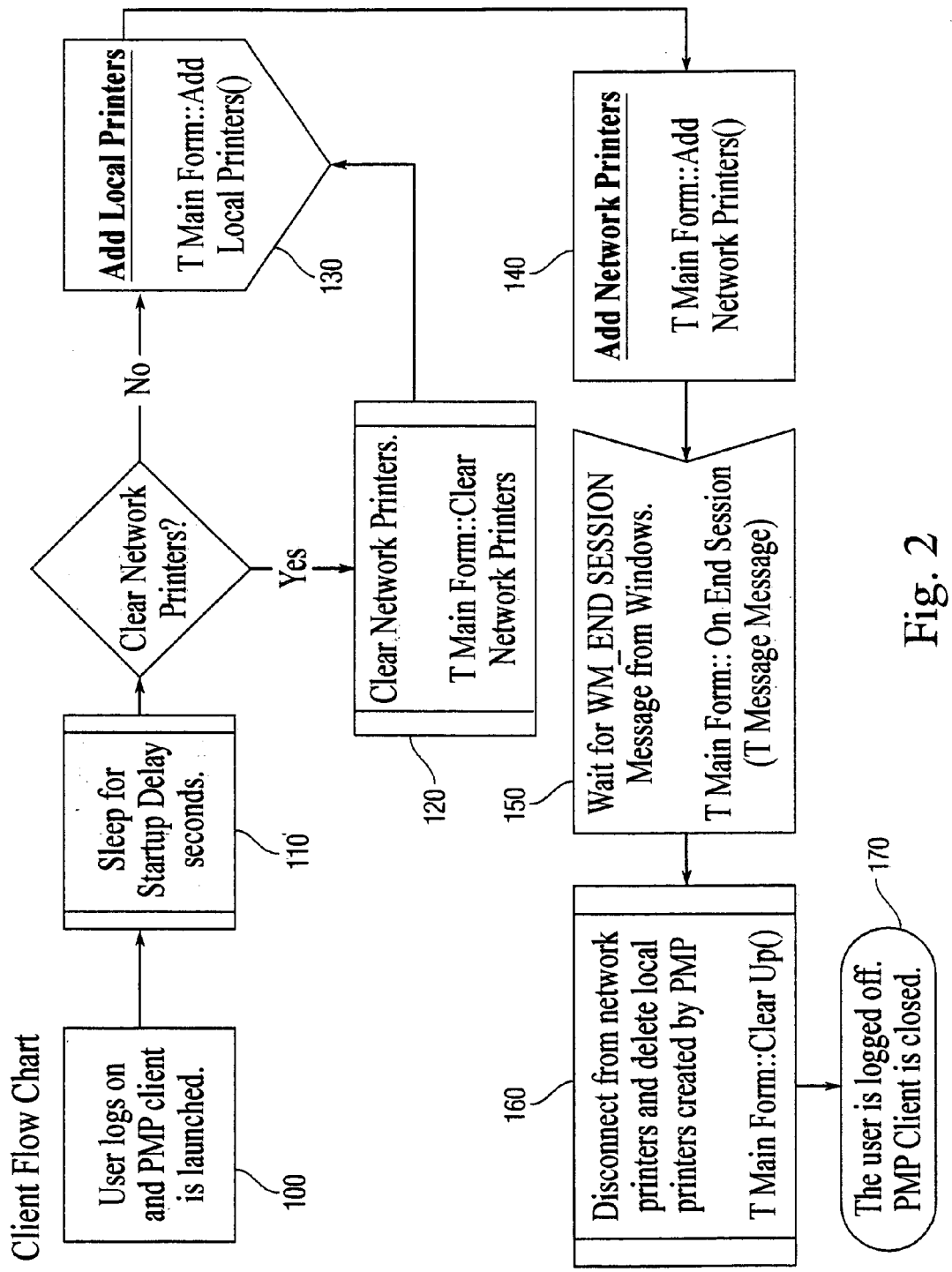
FIG. 2 is a top-level flow diagram of the PMP Client according to the present invention.

FIG. 2 is a top-level flow diagram of the PMP Client Software method according to the present invention.

At Step 100, the user logs on and PMP Client Software is launched from the UserInit string. UserInit is a system program that starts all programs listed in the UserInit string at logon and initializes variables. The implementing source code for step 100 can be found at FIG. 6-2.

Step 110 introduces a delay during which the program sleeps for a predetermined number of seconds (StartupDelay). The implementing source code for step 10 can be found at FIG. 6-9. In many cases, users will manually connect to network printers during their session. This can cause problems if the user is not familiar with the naming schemes involved in connecting to network printers. The PMP Centralized Administration Server Software allows the administrator to set a flag in the PMP Client Software to force the clearing of all network printers at logon. If this flag is set, Step 120 clears the network printer connections stored in the user profile. The implementing source code for step 120 can be found beginning at FIG. 6-10.

Figure 3:
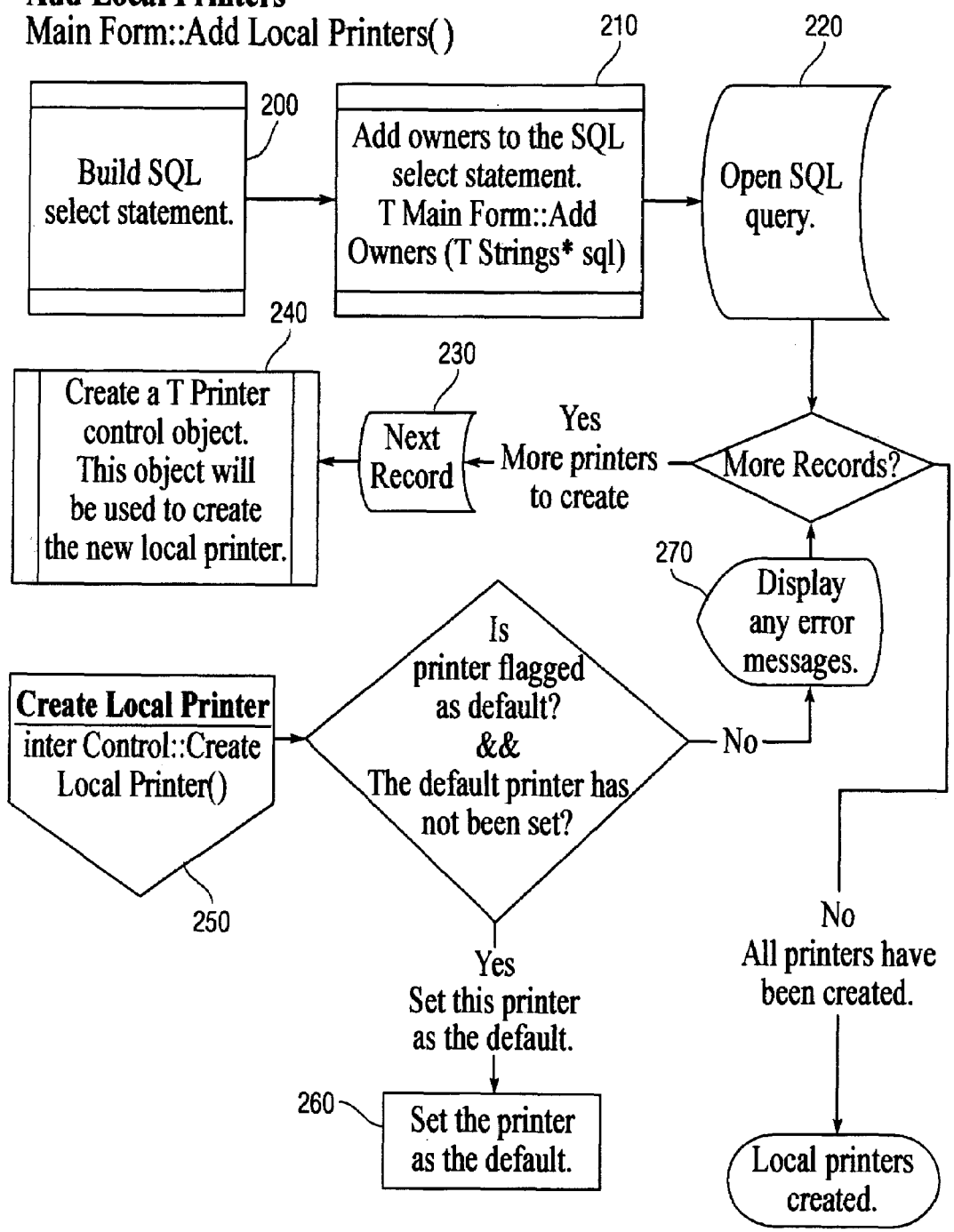
FIG. 3 is a detailed flow diagram of the Add Local Printers step 130 of FIG. 3 that displays the method for reading a database and adding local printers (printers directly connected to a user's computer or terminal).

Program flow proceeds to Step 130 where local printers are added, and FIG. 3 illustrates a detailed Add Local Printers flow chart representative of this step. The implementing source code for step 130 can be found beginning at FIG. 6-3.

Beginning at Step 200, the program builds the select statement used to query the database for the assigned local printers. The implementing source code for step 200 can be found at FIG. 6-4. The select statement is the primary query command for Structured Query Language (also known as SQL). "Owners" are a combination of groups that a user belongs to, the user name, the terminal name (client name)

and the computer name. Owners are assigned printers or printer connections in the PMP Centralized Administration program and these assignments are stored in the Assigned-LocalPrinters table of the PMP Database described above.

Step 210 adds the Owners that the user belongs to, to the SQL select statement as shown. The implementing source code for step 210 can be found at FIG. 6-4.

Step 220 runs the query defined by the SQL select statement. The implementing source code for step 220 can be found at FIG. 6-4.

If there are no records returned, the Add Local Printers Step 130 is complete. Otherwise, for each record returned, the following steps are repeated.

Step 230 moves the database pointer to the next printer to be added. The implementing source code for step 230 can be found at FIG. 6-4.

Step 240 creates a new TPrinterControl object that encapsulates the printer creation. The implementing source code for step 240 can be found at FIG. 6-4.

Figure 4:
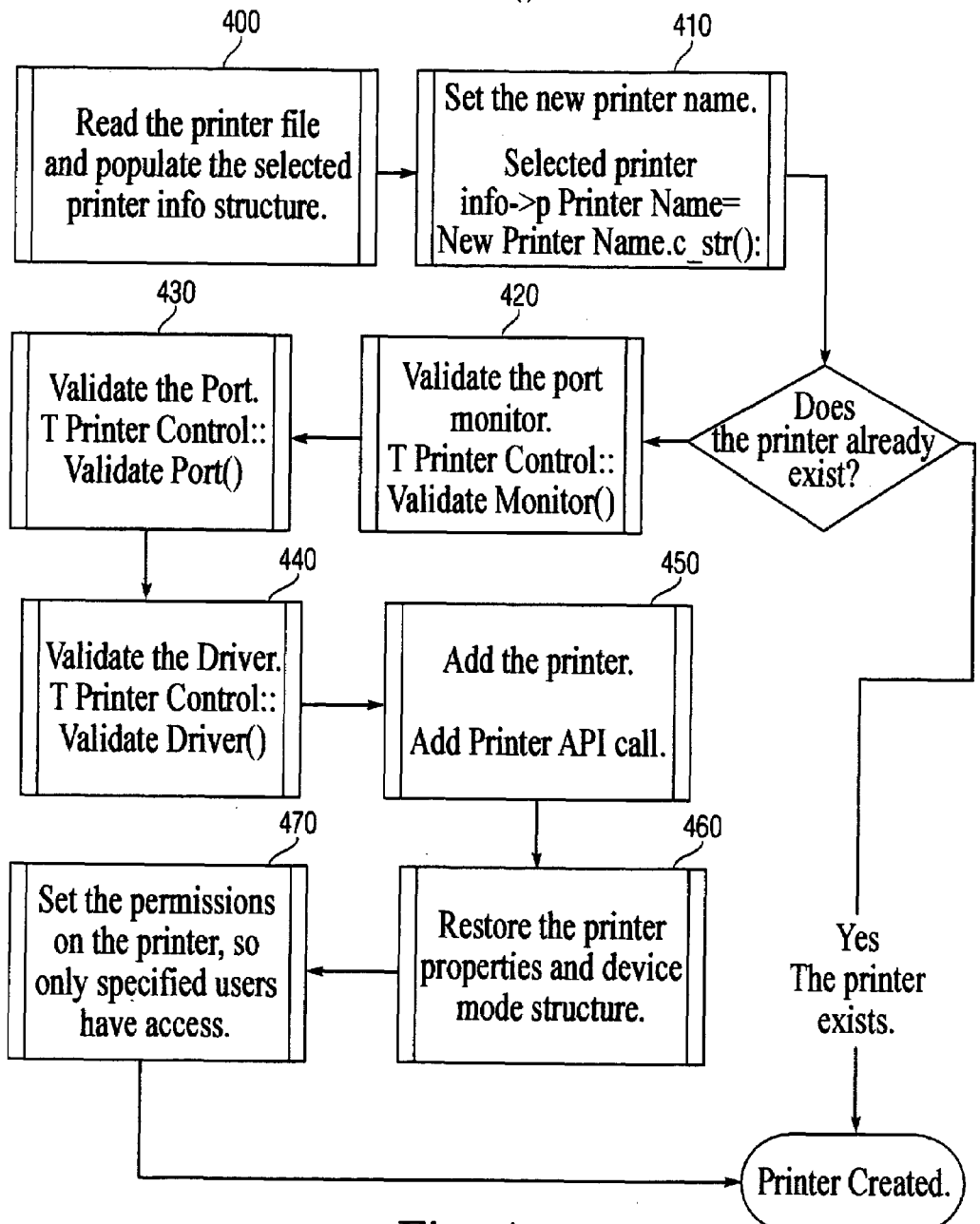
FIG. 4 is a detailed flow diagram of the Add Network Printers step 140 of FIG. 3 that displays the method for reading a database and connecting to network printers (printers not directly connected to the user's computer or terminal).

Step 250 takes us to the Create Local Printer step, and FIG. 4 illustrates a detailed Create Local Printer flow chart representative of this step. The implementing source code for step 250 can be found beginning at FIG. 6-4.

With reference to FIG. 4, the creation of local printers is based on storing the printer information in a group of files called Printer Configurations.

Step 400 reads the printer configuration stored for the selected printer and populates the SelectedPrinterInfo structure (see TPrinterControl::SelectedPrinterInfo for details). The implementing source code for step 400 can be found at FIG. 6-38.

Step 410 sets the new printer name. The implementing source code for step 410 can be found at FIG. 6-38. If the printer already exists, Create Local Printer exits. A printer port monitor is the driver that controls the particular port that will be used to connect to the printer. Example: If the port is an LPT port, then the port monitor is a "Local Port". Step 420 validates the port monitor. The implementing source code for step 420 can be found at FIG. 6-38.

Step 430 validates the port, creating it if it does not exist. The implementing source code for step 430 can be found at FIG. 6-39. Step 440 validates the printer driver. The implementing source code for step 440 can be found at FIG. 6-39. If the print driver does not exist on the client computer, then PMP will install the driver automatically. Step 450 adds the new local printer. The implementing source code for step 450 can be found beginning at FIG. 6-39. Preferably, the new printer name is prefixed with either <CLIENTNAME># or <USERNAME># to maintain compatibility with Citrix MetaFrame for Microsoft Windows NT Terminal Server Edition. The CLIENTNAME variable is defined as the name of the terminal connected to the Windows NT Terminal Server Edition and can be found by typing "SET" at the command prompt of the user.

Step 460 restores the printer settings saved in the assigned printer configuration file. The implementing source code for step 460 can be found beginning at FIG. 6-39.

Step 470 sets the permissions on the printer, so only the SYSTEM and the user have access to the printer, thus restricting the printer from unauthorized users. The implementing source code for step 470 can be found beginning at FIG. 6-40.

At this point, the creation of the new local printer is complete.

Returning back to the Add Local Printers routine of FIG. 3, if the printer has been flagged by the administrator (In the database) as the default printer, and a default printer has not yet been set, the method proceeds to Step 260.

Step 260 sets the printer as the default. The implementing source code for step 260 can be found at FIG. 6-5. Step 270 displays any error messages generated by Step 250. The implementing source code for step 270 can be found at FIG. 6-5.

Figure 5:
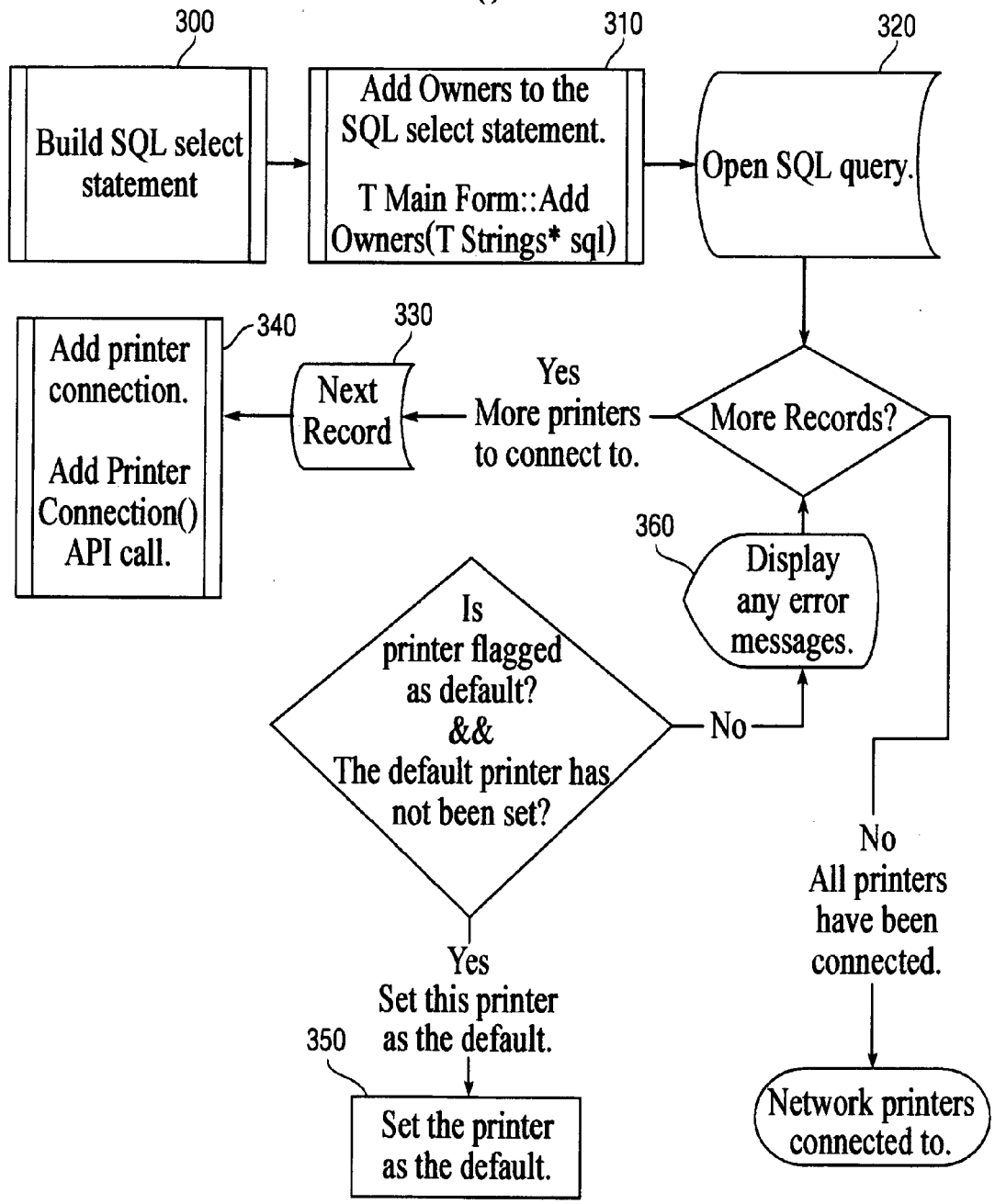
FIG. 5 is a more detailed flow diagram of the Create Local Printer step 250 of FIG. 4 that shows the method for creating a local printer.

Referring back to FIG. 2, once all local printer records have been processed, the Add Local Printers Step 130 is complete. After the local printers are added, program flow proceeds to Step 140, the Add Network Printers step. FIG. 5 illustrates a detailed Add Network Printers flow chart representative of this step.

Referring to FIG. 5, Step 300 builds the SQL select statement used to query the database for the assigned network printers. The implementing source code for step 300 can be found beginning at FIG. 6-6.

Step 310 adds the Owners that the user belongs to, to the SQL select statement. The implementing source code for step 310 can be found at FIG. 6-6.

Step 320 runs the query. The implementing source code for step 320 can be found at FIG. 6-6.

For each record returned, Step 330 moves the database pointer to the next printer to be added. The implementing source code for step 330 can be found at FIG. 6-6.

Step 340 adds the network printer connection using the AddPrinterConnection API call. The implementing source code for step 340 can be found at FIG. 6-6. If the printer has been flagged by the administrator as the default printer, and a default printer has not yet been set, program flow proceeds to Step 350.

Step 350 sets the printer as the default, and the implementing source code for step 350 can be found beginning at FIG. 6-6.

Step 360 displays any error messages generated. Add Network Printers is complete. The implementing source code for step 360 can be found beginning at FIG. 6-7.

Referring back to FIG. 2, once all printers have been created and connected, program flow proceeds to step 150 and the PMP Client Software will wait for the WM_END-SESSION message to be broadcast. The implementing source code for step 150 can be found beginning at FIG. 6-12.

Once the WM_ENDSESSION message has been received, Step 160 removes the printers and printer connections made by PMP Client. The implementing source code for step 160 can be found beginning at FIG. 6-9.

Step 170 is the logoff of the user and closing of PMP Client Software. The implementing source code for step 170 can be found beginning at FIG. 6-2.

The above-described client and server software components and the methods reflected therein make it possible to map printers back to the client stations 20-1-1 . . . n. By assigning printers 40-1-1 . . . n to the ClientName (terminal name), the PMP is able to automatically create the printer queues as the users logon from those client stations. Printers are also created additively based on Windows NT group membership. So, if a particular group such as the accounting department has a printer that has specific settings, the PMP can configure all authorized user connections to this printer simply by assigning the printer to the accounting group with all the correct properties, and then assigning the appropriate users to the accounting group. Printers can also be denied to groups of users, users and clientnames (computer names).

The method is ideal for shared printing in mixed-LAN environments, and stands as a solution for all major network operating systems for Ethernet, 100Base-T, 100VG Any- LAN, Token Ring, and LocalTalk networks. It facilitates easy installation and configuration of virtually any printer for direct LAN connectivity. The entire process is automated, and all printer management protocol and printer configuration problems are solved. It is simple for LAN administrators to remotely configure and manage all printers. There is automatic driver installation and printer configuration, and remote configuration is shown graphically on the administrator PC screen. The protocol greatly simplifies printer management over PC print servers, file server connections and PC parallel-port connected printers, inclusive of high-speed IEEE 1284 compliant parallel ports on external print servers.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A method for managing printers in a network environment, comprising:
    defining all groups that a new user belongs to, as well as a user name, client name, and station name when said new user logs onto a client station in the network;
    automatically executing a printer management software program each time that a user logs onto said network;
    said printer management software program querying a printer database to establish all printers that the designated groups, user, client and station have been assigned; and
    said printer management software program executing a configuration routine for each assigned printer identified in said query step, said routine comprising the following substeps;
        checking whether a printer driver is installed for each assigned printer and, if not, installing the printer driver;
        automatically configuring each assigned printer identified in said querying step,
    whereby said configuration routine is executed for each assigned printer identified in said querying step until all such assigned printers are fully configured.

2. The method for managing printers in a network environment according to claim 1, wherein said step of executing a configuration routine for each assigned printer identified in said query step further comprises executing a routine to configure local printers connected to the user's computer, whereby all required driver software is automatically installed and the permissions of the local printer are set so that only authorized users can access the local printer.

3. The method for managing printers in a network environment according to claim 2, wherein said step of executing a configuration routine for each assigned printer identified in said query step further comprises executing a routine to configure network printers connected to the user's network, whereby all required driver software is automatically installed and the permissions of the network printers are set so that only authorized users can access the network printers.

4. The method for managing printers in a network environment according to claim 1, wherein said step of executing a configuration routine for each assigned printer identified in said query step further comprises automatically setting a default printer for the user.

5. The method for managing printers in a network environment according to claim 1, further comprising a step of cleaning up all created printers and printer connections when a user logs off, thereby preventing accumulation of unwanted and unneeded printers and printer connections.

* * * * *